US012643680B2

(12) United States Patent
Han et al.

(10) Patent No.: US 12,643,680 B2
(45) Date of Patent: Jun. 2, 2026

(54) AERIAL VEHICLE AND CONTROL METHOD THEREOF, USING HYBRID DISTRIBUTED PROPULSION SYSTEM

(71) Applicant: THINKWARE CORPORATION, Seongnam-si (KR)

(72) Inventors: Taekyu Han, Seongnam-si (KR); Suk Pil Ko, Seongnam-si (KR); Shin Hyoung Kim, Seongnam-si (KR); Yo Sep Park, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 0 days.

(21) Appl. No.: 18/107,765

(22) Filed: Feb. 9, 2023

(65) Prior Publication Data

US 2023/0312116 A1     Oct. 5, 2023

(30) Foreign Application Priority Data

Feb. 9, 2022   (KR) ........................ 10-2022-0017045
Feb. 9, 2022   (KR) ........................ 10-2022-0017115
(Continued)

(51) Int. Cl.
B64F 5/60          (2017.01)
B64D 27/02        (2006.01)
(Continued)

(52) U.S. Cl.
CPC ................ B64F 5/60 (2017.01); B64D 27/33 (2024.01); B64D 27/357 (2024.01); B64D 31/06 (2013.01); B64D 31/18 (2024.01); B64D 27/026 (2024.01)

(58) Field of Classification Search
CPC ...... B64D 27/026; B64D 27/24; B64D 27/02; B64D 31/00; B64F 5/60; G08G 5/003; G08G 5/0034
See application file for complete search history.

(56) References Cited

U.S. PATENT DOCUMENTS 9,376,213 B2   6/2016   Rolt
9,896,200 B2   2/2018   Fredericks et al.
(Continued)

FOREIGN PATENT DOCUMENTS

EP      3243750 A1   11/2017
EP      3392148 A1   10/2018
(Continued)

OTHER PUBLICATIONS

Nguyen et al., "Distributed Propulsion Aircraft with Aeroelastic Wing Shaping Control for Improved Aerodynamic Efficiency." (38 pages).
(Continued)

*Primary Examiner* — Ashesh Dangol
(74) *Attorney, Agent, or Firm* — WHDA, LLP

(57)               ABSTRACT

Disclosed are an aerial vehicle using a hybrid distributed propulsion system and a control method thereof. According to an embodiment of the present specification, an aerial vehicle includes a power generation unit generating electricity by consuming fuel; a battery unit that is charged with power supplied from the power generation unit or supplied with power from the outside; a plurality of fan modules receiving power from the battery unit or the power generation unit to provide lift to the aerial vehicle; a power supply path control unit selecting at least one of the power generation unit and the battery unit to supply power to at least one
(Continued)

UAM Aircraft(152)

| GPS RECEIVING UNIT (671) |
| NEURAL ENGINE UNIT (672) |
| INS(Inertial navigation system) (673) |
| STORAGE UNIT (674) |
| DISPLAY UNIT (675) |
| COMMUNICATION UNIT (676) |
| FLIGHT CONTROL UNIT (677) |

PROCESSING UNIT (670)

SENSOR UNIT (678)
INSPECTION UNIT (679)

POWER SUPPLY UNIT (61)
PROPULSION UNIT (63)
POWER CONTROL UNIT (65)

of the plurality of fan modules; and a route generation unit generating a flight route from a departure point to a destination of the aerial vehicle.

8 Claims, 30 Drawing Sheets

(30)         Foreign Application Priority Data

Feb. 9, 2022    (KR) ......................... 10-2022-0017181
Feb. 9, 2023    (KR) ......................... 10-2023-0017641

(51)  Int. Cl.
    *B64D 27/33*        (2024.01)
    *B64D 27/357*       (2024.01)
    *B64D 31/06*        (2024.01)
    *B64D 31/18*        (2024.01)

(56)           References Cited

U.S. PATENT DOCUMENTS

| | | | |
|---|---|---|---|
| 10,435,169 | B2 | 10/2019 | Steinwandel et al. |
| 10,556,680 | B2 | 2/2020 | Fenny et al. |
| 10,926,874 | B2 | 2/2021 | Giannini et al. |
| 11,121,557 | B2 | 9/2021 | Cottrell et al. |
| 2013/0046422 | A1* | 2/2013 | Cabos .................. G08G 5/0021 |
| | | | 701/120 |
| 2015/0279217 | A1* | 10/2015 | Chen .................... G08G 5/0039 |
| | | | 701/123 |
| 2017/0103590 | A1* | 4/2017 | Garel ..................... G06Q 10/20 |
| 2017/0203839 | A1 | 7/2017 | Giannini et al. |
| 2017/0210481 | A1* | 7/2017 | Bak ........................ B64U 50/33 |
| 2018/0251226 | A1 | 9/2018 | Fenny et al. |
| 2021/0206487 | A1* | 7/2021 | Iqbal ...................... B64C 11/28 |
| 2021/0263537 | A1* | 8/2021 | Belt ...................... B64C 39/024 |
| 2021/0276723 | A1* | 9/2021 | Han ...................... B64D 27/24 |
| 2021/0331791 | A1 | 10/2021 | Geuther et al. |
| 2023/0202664 | A1* | 6/2023 | Haga ..................... B64D 27/02 |
| | | | 244/75.1 |

FOREIGN PATENT DOCUMENTS

| | | |
|---|---|---|
| EP | 3243750 B1 | 7/2020 |
| EP | 3403933 B1 | 3/2021 |
| KR | 10-1667330 B1 | 10/2016 |
| KR | 10-2018-0101335 A | 9/2018 |
| KR | 10-1953892 B1 | 3/2019 |
| KR | 10-2004227 B1 | 7/2019 |
| KR | 10-2019-0133799 A | 12/2019 |
| KR | 10-2020-0057058 A | 5/2020 |
| KR | 10-2020-0067901 A | 6/2020 |
| KR | 10-2021-0008017 A | 1/2021 |

OTHER PUBLICATIONS

Kim et al., "A Review of Distributed Electric Propulsion Concepts for Air Vehicle Technology." (21 pages).

* cited by examiner

UAM Aircraft(152)

1302: First power supply path
1304: Second power supply path

Flight Control System (1500)

AERIAL VEHICLE AND CONTROL METHOD THEREOF, USING HYBRID DISTRIBUTED PROPULSION SYSTEM

BACKGROUND

1. Field

The technical idea of the present disclosure relates to an aerial vehicle using a hybrid distributed propulsion system powered by an internal combustion engine and/or battery and a control method thereof.

2. Description of Related Art

Due to population growth and overcrowding in large cities worldwide, mobility efficiency of city residents is rapidly decreasing, and social costs such as logistics transportation costs are rapidly increasing. However, as the existing ground transportation has limitations in solving the above-described problems, countries around the world are rushing to develop urban air mobility (UAM) as a next-generation mobility solution that maximizes mobility in the city.

In addition, in the case of a general aircraft (in particular, fixed-wing aircraft), since a runway of a certain length or longer is essential for take-off and landing, the take-off and landing of the general aircraft may only be made at an airport located on the outskirts of a certain distance from the urban area, so accessibility from the urban area was inevitably reduced. However, the UAM aerial vehicle are being developed for the purpose of increasing accessibility in the urban area, and unlike the general aircraft, the take-off and landing should be performed using a minimum of space, so the vertical take-off and landing (VTOL) method is the most desirable method due to the flight characteristics of the UAM aerial vehicle.

In the initial stage of the UAM introduction, based current aircraft operation regulations, international aviation organizations such as International Civil Aviation Organization (ICAO) enact UAM flight operation regulations that reflect flight characteristics in the urban environments of each country, and unlike the existing airframe types, which are broadly divided into fixed-wing and rotary-wing according to the regulations, it is highly likely to develop into a stage where flight certification for new concept airframe types suitable for flight in the urban environment is permitted.

For the safe flight of such UAM within the city, the UAM service operator or the UAM fleet management system may establish a flight corridor which is a dedicated route for the flight of the UAM aerial vehicle over the urban area, and assign preset air corridors to UAM vehicles. The establishment of such a dedicated UAM air corridor enables highly autonomous traffic management for the UAM aerial vehicles compared to the existing aircrafts, thereby preventing problems such as collisions that may occur between the UAM aerial vehicles that may occur in the sky over a complex city. As a result, it is highly likely that technologies and policies will develop in a way that allows the UAM aerial vehicles to fly efficiently and safely.

The evolution of the UAM-related technologies enables detection-and-avoidance (DAA) related technology for objects during the flight of the UAM aerial vehicle and various technologies for other UAM operations to the UAM aerial vehicle at an early stage.

Advanced user mobile devices such as cloud networks and smart phones enable user interaction and fleet management support for UAM's on-demand service.

Growing public acceptance of aircraft integrity and automation in the ride sharing economic model will help increase UAM operations.

Unlike the existing aircrafts designed for high-speed long-distance flights at high altitude outside the urban area due to the characteristics of the UAM aerial vehicle which mainly flies in the urban environments, since the UAM industry vision mainly flies over the urban area, which is sensitive to noise, it involves incorporating different aircraft design and system technologies from the existing aircraft.

The new aircraft designs have vertical take-off and landing (VTOL) capability and in order to enable operation in various environments such as large cities, it is preferable to consider using, as a main power supply source, an electric motor or the like that generates less noise than the general aircraft mainly using an internal combustion engine.

Major aviation innovations such as advances in distributed electric propulsion (DEP) and the development of electric VTOL (eVTOL) will enable more frequent flights in a wider variety of places compared to flights limited to the suburban area in the conventional aircraft.

Currently, since the UAM aerial vehicle secured the flexibility of airframe design through the DEP technology, aircrafts having various shapes are being developed. It is not preferable to apply the classification of a fixed-wing aircraft and a rotary-wing aircraft, which is a traditional classification of aircraft, to the shape classification of the UAM aerial vehicle. Instead, classifying the shape of the UAM aerial vehicle into a type with a wing and a type without a wing would rather be a good criterion for classifying the types of UAM aerial vehicle.

The types with a wing are classified into a tilt rotor type, a tilt wing type, and a combined lift type, and the DEP may also be classified into a rotor/propeller type and a ducted rotor/ducted fan type. Currently, most UAM aerial vehicles are designed to enable point-to-point transportation that does not require a runway by applying the electric vertical take-off and landing (eVTOL) concept.

For flight over the urban area, safety of the airframe is the first factor to consider, followed by noise and smoke.

Therefore, eVTOL is an essential factor for the take-off and landing performance of the UAM aerial vehicle for noise reduction and zero smoke, and among the eVTOL types, related technologies such as technologies of vectored thrust type, a lift+cruise type, and a multi-copter type are rapidly maturing through development competition. However, high-output motors, battery technologies, and the like should be further developed.

Next, in order to reduce the flight noise to a level of 60 dB due to the characteristics of flight over the city, it is most effective to use the distributed propulsion (DP) method as the propulsion method of the UAM aerial vehicle.

Although it is efficient to use a single rotor in terms of overall performance, it becomes a very unfavorable shape in terms of noise, and the distributed propulsion is a concept that may increase flexibility to design various shapes. In addition, the single rotor has the advantage of being able to land safely through automatic rotation in many flight areas in the event of an engine failure, but when a vortex ring condition occurs, relatively unstable flight may cause accidents. On the other hand, the distributed propulsion method is impossible to automatically rotate, such as a single rotor method. However, the method applies a design that may safely land through the rest of the rotors/props even if a failure occurs in some rotors/props, or since it increases flight safety due to its low possibility of vortex ring condition, most UAM aerial vehicles have a DEP concept of applying at least six propulsion units to generate flight power.

In signs of UAM-related industries and service providers and the initial operation stage of the UAM system, it is highly likely to operate while a pilot in command (PIC) is on board a VTOL aircraft capable of fully automated operations by remote control.

However, when the stability of the UAM aerial vehicle and/or the UAM operating system enters a stabilization stage to some extent, it is possible to manufacture the UAM aerial vehicle at a lower cost, and when the level of automation of the UAM aerial vehicle is very mature, in order to transport more cargo/passengers by one-time flight, even if there is no PIC, it is possible to operate the UAM aerial vehicle remotely. Such remote UAM aerial vehicle operation reduces the operational cost of the UAM aerial vehicle, and many UAM operating companies will provide UAM services to the public not only for long-range air transport but also for short-range air transport.

Therefore, since the UAM should safely and conveniently transport people and cargo in the urban environment based on electrically powered low-noise aircraft and vertical take-off and landing pads, it is natural that low-noise and vertical take-off and landing functions should be premised upon when designing the UAM aerial vehicle.

Since the aircraft with the conventional take-off and landing (CTOL) method not only need to secure a large site for take-off and landing, but also restrict the installation of buildings or structures through the establishment of obstacle limiting surfaces around the site for the take-off and landing, it is necessary to establish a free environment in pollution, noise, and safety by limiting the altitude of buildings or structures around the site for the take-off and landing.

In addition, a heliport, which is installed so that a vertical take-off and landing aircraft such as a helicopter may take off and land on a rooftop of a high-rise building, is installed only in high-rise and large-scale buildings that meet certain requirements for evacuation in the event of a disaster such as fire, and has a different purpose from constructing urban transport aviation.

As described above, the vertical take-off and landing method is the most preferable for the UAM aerial vehicle to be operated in the urban area where it is difficult to secure a large site and high-rise buildings are densely populated, and it is preferable to minimize pollution and noise by applying an electric propulsion method as a power supply source.

SUMMARY

Accordingly, an object of the present disclosure is to solve the above problems.

The present disclosure is to provide an aerial vehicle using a hybrid distributed propulsion system in which an electric propulsion method and an internal combustion engine propulsion method are mixed.

The present disclosure is to provide an urban traffic air transportation means capable of minimizing the generation of pollution or noise during take-off and landing in the urban area.

The present disclosure is to provide an aerial vehicle equipped with a propulsion system for effectively performing short-distance operation such as intra-city traffic, traffic between adjacent areas within and outside the city, or long-distance operation across cities.

The present disclosure is to provide an aerial vehicle that operates a propellant through electric propulsion to minimize noise and pollution in the urban area and operates a propellant through an internal combustion engine propulsion method in order to increase an operating range, payload, flight time, and the like of the aerial vehicle when operating outside the urban area.

In an aspect of the present disclosure, an aerial vehicle includes: a power generation unit generating electricity by consuming fuel; a battery unit that is charged with power supplied from the power generation unit or supplied with power from the outside; a plurality of fan modules receiving power from the battery unit or the power generation unit to provide lift to the aerial vehicle; a power supply path control unit selecting at least one of the power generation unit and the battery unit to supply power to at least one of the plurality of fan modules; and a route generation unit generating a flight route from a departure point to a destination of the aerial vehicle, in which the power supply path control unit selects at least one of the power generation unit and the battery unit based on a location on the flight route and a flight stage of the aerial vehicle to supply power to at least one of the plurality of fan modules.

The power supply path control unit may supply power to at least one of the plurality of fan modules through the battery unit when the flight stage of the aerial vehicle corresponds to a take-off or landing stage.

The power supply path control unit may supply power to at least one of the plurality of fan modules through the power generation unit when the flight stage of the aerial vehicle corresponds to a cruising stage.

The power supply path control unit may supply power to at least one of the plurality of fan modules through the battery unit when the flight stage of the aerial vehicle corresponds to any one of take-off, ascending, descending, and landing stages, and the location on the flight route of the aerial vehicle is an urban area.

The power supply path control unit may supply power to at least one of the plurality of fan modules through the battery unit when the flight stage of the aerial vehicle corresponds to the cruise stage and the location on the flight route of the aerial vehicle is an urban area.

The power supply path control unit may supply power to at least one of the plurality of fan modules through the power generation unit when the location on the flight route of the aerial vehicle deviates from a city area.

The aerial vehicle may further include a power management control unit determining a charged amount of the battery unit and a loaded amount of the fuel based on an amount of energy consumption required for the flight route.

The power management control unit may determine an allowable gross take-off weight (AGTOW) based on the charged amount of the battery unit and the loaded amount of the fuel.

The aerial vehicle may further include an inspection unit inspecting a configuration of the pre-flight aerial vehicle, in which, when an inspected result value is different from a preset result value, the inspection unit may determine whether the aerial vehicle flies from the departure point to the destination along the flight route generated by the route generation unit.

The aerial vehicle may further include a display unit displaying an appearance of the aerial vehicle and displaying an order in which the inspection unit inspects the configuration of the aerial vehicle.

In another aspect of the present disclosure, a method of controlling an aerial vehicle includes: inspecting a system of an aerial vehicle before flight; comparing an inspected result value and a preset result value after the inspecting; and when there is a difference in the comparing, determining whether the aerial vehicle is in normal flight.

In the determining whether the aerial vehicle is in normal flight, when the aerial vehicle is in the normal flight, a first power supply source selection step of selecting, as a power supply source, any one of a power generation unit that consumes fuel to generate power and a battery unit that is charged by receiving power from the power generation unit or receiving power from the outside may be performed.

The method may further include, when there is no discrepancy in the comparing, a confirmation step of determining whether the aerial vehicle is a last inspection item among the system inspection items.

The first power supply source selection step may include a thrust determining step of determining a loaded amount of the fuel and a charged amount of the battery unit.

An allowable gross take-off weight (AGTOW) of the aerial vehicle may be determined based on the thrust determining step, and it may be determined whether the take-off step of the aerial vehicle is performed by comparing a weight of the aerial vehicle with the allowable gross take-off weight (AGTOW) of the aerial vehicle.

The first power supply source selection step may further include: determining energy consumption for the takeoff of the aerial vehicle; and a first determination step of determining whether the aerial vehicle is located in an urban area, and at least one of the power generation unit and the battery unit is selected as a power supply source based on the determined energy consumption and the location of the aerial vehicle.

The method may include: performing takeoff of the aerial vehicle through the power supply source selected in the first power supply source selection step; and a second determination step of determining whether the location of the aerial vehicle is an urban area after takeoff of the aerial vehicle, in which at least one of the power generation unit or the battery unit may be selected as a power supply source based on the location of the aerial vehicle.

In the second determination step, when the location of the aerial vehicle corresponds to an urban area, based on whether the aerial vehicle flies through the battery unit, it may be determined whether the altitude of the aerial vehicle climbs.

An embodiment of the present disclosure may disclose a program stored in a computer-readable recording medium including a program code for executing the control method of the above-described aerial vehicle.

An embodiment of the present disclosure may disclose a computer-readable recording medium on which a program for executing the control method of the above-described aerial vehicle is recorded.

DETAILED DESCRIPTION

Hereinafter, detailed embodiments of the present disclosure will be described with reference to the accompanying drawings. The following detailed descriptions are provided to help a comprehensive understanding of methods, devices and/or systems described herein. However, the embodiments are described by way of examples only and the present disclosure is not limited thereto.

In describing the embodiments of the present disclosure, when a detailed description of well-known technology relating to the present disclosure may unnecessarily make unclear the spirit of the present disclosure, a detailed description thereof will be omitted. Further, the following terminologies are defined in consideration of the functions in the present disclosure and may be construed in different ways by the intention of users and operators. Therefore, the definitions thereof should be construed based on the contents throughout the specification. The terms used in the detailed description is merely for describing the embodiments of the present disclosure and should in no way be limited. Unless clearly used otherwise, an expression in the singular form includes the meaning of the plural form. In this description, expressions such as "including" or "comprising" are intended to indicate certain characteristics, numbers, steps, operations, elements, some or combinations thereof, and it should not be interpreted to exclude the existence or possibility of one or more other characteristics, numbers, steps, operations, elements, parts or combinations thereof other than those described.

In addition, terms 'first', 'second', A, B, (a), (b), and the like, will be used in describing components of embodiments of the present disclosure. These terms are used only in order to distinguish any component from other components, and features, sequences, or the like, of corresponding components are not limited by these terms.

Urban air mobility (UAM) used throughout this specification comprehensively refers to an urban transportation system that transports people and cargo using aircraft rather than ground transportation means. An airframe applied to a UAM operation may include a fixed-wing aircraft and personal air vehicle (PAV) type capable of horizontal take-off and landing, also known as vertical take-off and landing (VTOL) or conventional take-off and landing (CTOL).

More specifically, the urban air mobility (UAM) enables highly automated, passenger- and cargo-transporting air transport services in and around the urban area.

Urban air traffic is an aggregation of advanced air mobility (AAM) being developed by governments and industries. The AAM enables transportation of people and cargo in regional, local, international and urban environments. Among those, the UAM is being operated to suit movement in the urban area.

Figure 1:
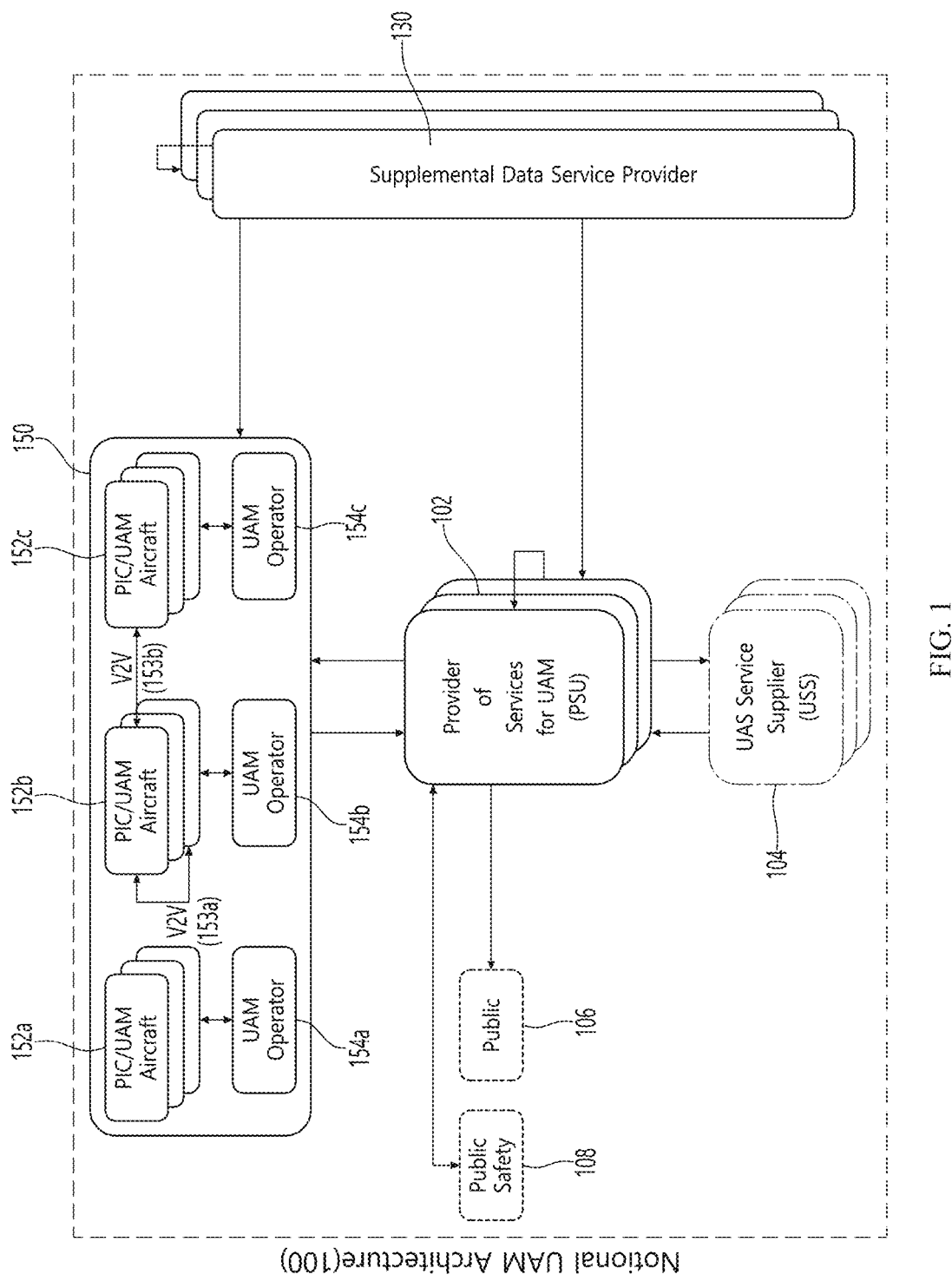
FIG. 1 is a diagram illustrating a conceptual architecture of UAM according to an embodiment of the present disclosure.

FIG. 1 is a diagram illustrating a conceptual architecture of UAM according to an embodiment of the present disclosure. Hereinafter, referring to FIG. 1, a conceptual architecture 100 of UAM that may be defined in an environment for UAM operation management will be described.

First, terms generally used in this specification will be defined to help understanding of the present disclosure.

A UAM aerodrome refers to a location where a UAM flight operation departs and arrives, a UAM aerial vehicle refers to aircraft capable of performing a UAM operation, a UAM flight corridor is a three-dimensional airspace with performance requirements for operating at a location where tactical air traffic control (ATC) separation services are not provided or are crossed, and an airspace assigned for flight of a UAM aerial vehicle to prevent collisions between a non-UAM aerial vehicle and the UAM aerial vehicle.

The UAM operation refers to transporting passengers and/or cargo from a UAM aerodrome at any one location to a UAM aerodrome at another location.

The UAM operation information includes, but not limited thereto, as information necessary for UAM operation, UAM operation identification information, UAM flight corridor information to be flown, UAM aerodrome information, and UAM operation event information (UAM aerodrome departure time, arrival time, etc.

A UAM operator represents an organization that manages overall UAM operations and performs each UAM operation. The UAM operator corresponds to a server that includes a network unit for managing a flight plan (or intent) of each UAM or a PIC UAM aerial vehicle and transmitting and receiving real-time information to and from each UAM or the PIC UAM aerial vehicle, a storage unit for storing information necessary for flight of each UAM/PIC UAM, a processor for monitoring the flight of each UAM/PIC UAM aerial vehicle and controlling autonomous flight, and a display unit for displaying a flight status of each UAM/PIC UAM aerial vehicle in real time.

An unmanned aircraft system traffic management (UTM) operator is an operator who utilizes UTM-specific services to perform low-altitude unmanned aircraft system (UAS) operation, and corresponds to a server that includes a network unit for transmitting and receiving information to and from each aerial vehicle in real time, a storage unit for storing information necessary for each flight, a processor for monitoring the flight of each aerial vehicle and controlling autonomous flight, and a display unit for displaying a flight status of each aerial vehicle in real time.

In general, since aircraft tends to comply with the regulations of ICAO and the Federal Aviation Administration (FAA), which are international organizations, this specification will also describe the UAM concept from the viewpoint of the FAA establishing regulations for safe operation of UAM.

First, in order to prevent accidents such as a midair collision between the UAM aerial vehicle or between the UAM aerial vehicle and the non-UAM aerial vehicle, it should be possible for the UAM operators to access FAA National Airspace System (NAS) data through FAA-industry data exchange protocols.

This approach enables authenticated data flow between the UAM operators and FAA operating systems. Referring to FIG. 1, UAM operators 154a, 154b, and 154c according to the present disclosure may be configured by a distributed network utilizing an interoperable information system.

In addition, the UAM operators 154a, 154b, and 154c may perform the UAM operation in a scheduled service or on-demand service method through a request of an individual customer or an intermodal operator.

The UAM operators 154a, 154b, and 154c are responsible for all aspects of regulatory compliance and UAM operational execution.

Hereinafter, the use of the term "operator" in this specification refers to an airspace user who has chosen to be operated through cooperative management within the UAM environment. More specifically, the operator may include a UAM operating system including electronic devices that include a processor, memory, database, network interface, communication module, etc., that are connected to a wired/wireless network to perform various controls and management required for the UAM operation.

The UAM operators 154a, 154b, and 154c may be closely connected to PIC/UAM aerial vehicles 152a, 152b, and 152c to exchange various information (flight corridor information, airframe condition information, weather information, aerodrome information, arrival time, departure time, map data, etc.) for flight of the plurality of PIC/UAM aerial vehicles 152a, 152b, and 152c in real time.

A volume of a group of the PIC/UAM aerial vehicles 152a, 152b, and 152c that each of the UAM operators 154a, 154b, and 154c may manage may be set differently according to the capability of the UAM operators 154a, 154b, and 154c. In this case, the capability information of the UAM operators 154a, 154b, and 154c may include the number of UAM aerial vehicles that may be accessed simultaneously, the number of UAM aerial vehicles that may be controlled simultaneously, a network traffic processing speed, processor capability of a server system, and a range of a control area, etc.

Among the plurality of PIC/UAM aerial vehicles 152a, 152b, and 152c, the PIC/UAM aerial vehicle controlled by the same UAM operators 154a, 154b, and 154c may each be grouped into one group and managed. In addition, inter-airframe vehicle to vehicle (V2V) communication 153a may be performed between the PIC/UAM aerial vehicles 152a, 152b, and 152c within the grouped group, and information related to operation may be shared through V2V communication between the PIC/UAM aerial vehicles 152a, 152b, and 152c included in different groups.

To determine desired UAM operational flight plan information such as location of flight (e.g., aerodrome locations), route (e.g., specific UAM corridor(s)), and desired flight time, the UAM operators 154a, 154b, and 154c acquire current status/conditions from at least one of information (environment, situational awareness information, strategic operational demand information, and UAM aerodrome availability) that a PSU 102 and a supplemental data service provider (SDSP) 130 provide.

The UAM operators 154a, 154b, and 154c should provide the flight plan and navigation data to the PSU 102 to be operated within or cross the UAM flight corridor.

In addition, the UAM operators 154a, 154b, and 154c should set planning data in advance for proper preparation when an off-nominal event occurs. The planning data includes understanding of alternative landing sites and the airspace classes bordering the UAM flight corridor(s) for operations.

When all preparations for the UAM operation are completed, the UAM operators 154a, 154b, and 154c provide the information related to the corresponding UAM operation to the PSU 102. In this case, the UAM operators 154a, 154b, and 154c may suspend or cancel the flight of the UAM aerial vehicle until a flight permission message is received from the PSU 102. In another embodiment, even if the UAM operators 154a, 154b, and 154c do not receive the flight permission message from the PSU 102, the UAM operators 154a, 154b, and 154c may start the flight of the UAM aerial vehicle by themselves.

In FIG. 1, the pilot in command (PIC) represents a case where a person responsible for operation and safety of the UAM in flight is on board the UAM aerial vehicle.

The provider of services for UAM (PSU) 102 may serve as an agency that assists the UAM operators 154a, 154b, and 154c to meet UAM operational requirements for safe and efficient use of airspace.

In addition, the PSU 102 may be closely connected with stakeholders 108 and the public 106 for public safety.

To support the capability of the UAM operators 154a, 154b, and 154c to meet the regulations and operating procedures for the UAM operation, the PSU 102 provides a communication bridge between UAMs and a communication bridge between PSUs and other PSUs through the PSU network 206.

The PSU 102 collects the information on the UAM operation planned for the UAM flight corridor through the PSU network 206, and provides the collected information to the UAM operators 154a, 154b, and 154c to confirm the duty performance capability of the UAM operators 154a, 154b, and 154c. Also, the PSU 102 receives/exchanges the information on the UAM aerial vehicles 152a, 152b, and 152c through the UAM operators 154a, 154b, and 154c during the UAM operation.

The PSU 102 provides the confirmed flight plan to other PSUs through the PSU network 206.

In addition, the PSU 102 distributes notification of an operating area in the flight plan (constraints, restrictions), FAA operational data and advisories, and weather and additional data to the UAM operators 154a, 154b, and 154c.

The PSU 102 may acquire UTM flight information through a UAS service supplier (USS) 104 network, and the USS network may acquire the UAM flight information through the PSU network 206.

In addition, the UAM operators 154a, 154b, and 154c may confirm the flight plan shared through the PSUs 102 and other UAM operators, and flight plan information for other flights in the vicinity, thereby controlling safer UAM flights.

The PSU 102 may be connected to other PSUs through the PSU networks 206 to acquire subscriber information, FAA data, SDSP data, and USS data.

The UAM operators 154a, 154b, and 154c and the PSU 102 may use the supplemental data service provider (SDSP) 130 to access support data including terrain, obstacles, aerodrome availability, weather information, and map data for a three-dimensional space. The UAM operators 154a, 154b, and 154c may access the SDSP 130 directly or through PSU network 206.

The USS 104 serves to support the UAS operation under the UAS traffic control (UTM) system.

Figure 2:
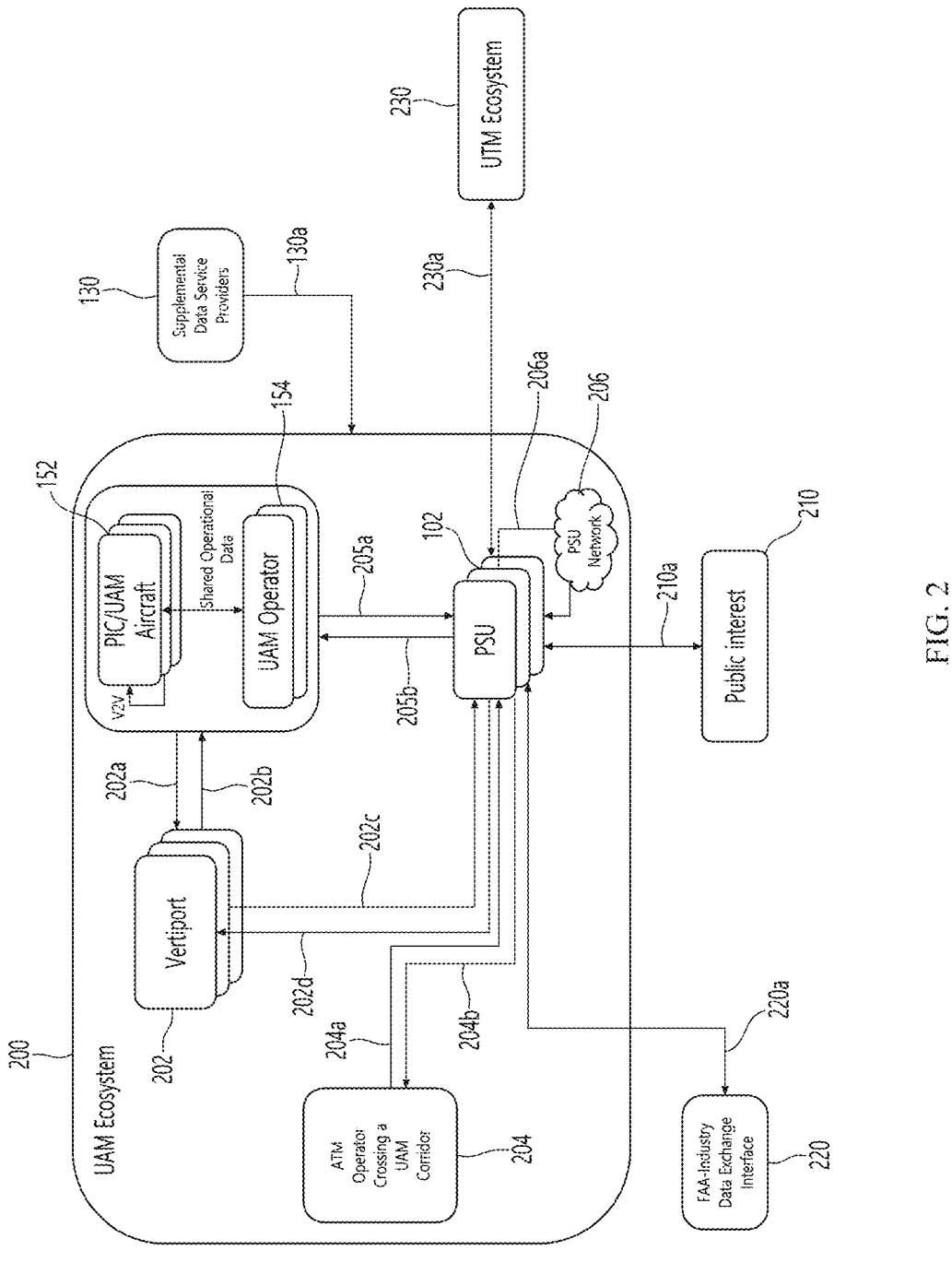
FIG. 2 is a diagram for describing an ecosystem of the UAM according to the embodiment of the present disclosure.

FIG. 2 is a diagram for describing an ecosystem of the UAM according to the embodiment of the present disclosure.

Referring to FIG. 2, the PIC/UAM aerial vehicle 152 and the UAM operator 154 transmit UAM operational intent information and UAM real-time data to a vertiport management system 202 (202a), and the vertiport management system 202 transmits vertiport capacity information and vertiport status information to the PIC/UAM aerial vehicle 152 and the UAM operator 154 (202b).

In addition, the PIC/UAM aerial vehicle 152 and the UAM operator 154 transmit a UAM operational intent request message, UAM real-time data, and UAM operation departure phase status information to the PSU 102 (205a).

The PSU 102 transmits UAM notifications, UAM corridor information, vertiport status information, vertiport acceptance information, and UAM operation intent response message to the PIC/UAM aerial vehicle 152 and the UAM operator 154 (205b). In this case, the UAM operational intent response message includes a response message informing of approval/deny, etc., for the UAM operational intent request.

The vertiport management system 202 transmits the UAM operation departure phase status information, the vertiport status information, and the vertiport acceptance information to the PSU 102 (202c). The PSU 102 transmits the UAM operational intent information and UAM real-time data to the vertiport management system 202 (202d).

In FIG. 2, when aerial vehicles (that is, non-UAMs) other than the UAM aerial vehicles need to cross the UAM flight corridor, the ATM operator 204 crossing the UAM flight corridor transmits a UAM flight corridor crossing request message to the PSU 102 (204a), and the PSU 102 transmits a response message to the UAM flight corridor crossing request message (204b).

In addition, in FIG. 2, the PSU 102 may perform a procedure for synchronizing UAM data with PSUs connected through the PSU network 206.

In particular, the PSU 102 may exchange information with other PSUs through the PSU network 206 to enable UAM passengers and UAM operators to smoothly provide UAM services (e.g., exchange of flight plan information, notification of UAM flight corridor status, etc.).

In addition, the PSU 102 may prevent risks such as collisions with the UAM aerial vehicle and the unmanned aerial vehicle, and transmit and receive UAM off-nominal operational information and UTM off-nominal operational information to and from the UTM ecosystem 230 for smooth control in real time (230a).

In addition, the PSU 102 shares FAA and UAM flight corridor availability, UAM flight corridor definition information, NAS data, a UAM information request, and response to the UAM information request, UAM flight corridor status information, and UAM off-nominal operational information through the FAA industrial data exchange interface 220 (220a).

In addition, the PSU 102 may transmit and receive the UAM information request and the response to the UAM information request to and from a public interest agency system 210. The public interest agency system 210 may be an organization defined by a management process (e.g., FAA, CBR) to have access to the UAM operation information. This access may support activities that include public right to know, government regulation, government guaranteed safety and security, and public safety. Examples of public interest stakeholders include regional law enforcement agencies and United States federal government agencies.

In addition, the UAM ecosystem 200 may receive supplemental data such as terrain information, weather information, and obstacles from supplemental data service providers (SDSP) 130 (130a), and thus, generate information necessary for safe operation of the UAM aerial vehicle.

In an embodiment of the present disclosure, the PSU 102 may confirm a corresponding UAM flight corridor use status through UAM flight corridor use status (e.g., active, inactive) information. For example, when the UAM flight corridor use status information is set to "active," the PSU 102 may identify whether the UAM flight is scheduled or whether the UAM aerial vehicle is currently flying in the corresponding flight corridor, and when the UAM flight corridor use status information is set to "inactive", the PSU 102 may identify that there is no UAM aerial vehicle currently flying in the corresponding flight corridor.

In addition, the PSU 102 may store operation data related to the flight of the UAM aerial vehicle in an internal database in order to identify a cause of an accident of the UAM aerial vehicle in the future.

These key functions allow the PSU 102 to provide the FAA with cooperative management of the UAM operation without being directly involved in UAM flight.

The PSU 102 may perform operations related to flight planning, flight plan sharing, strategic and tactical conflict resolution, an airspace management function, and an off-nominal operation.

Figure 3:
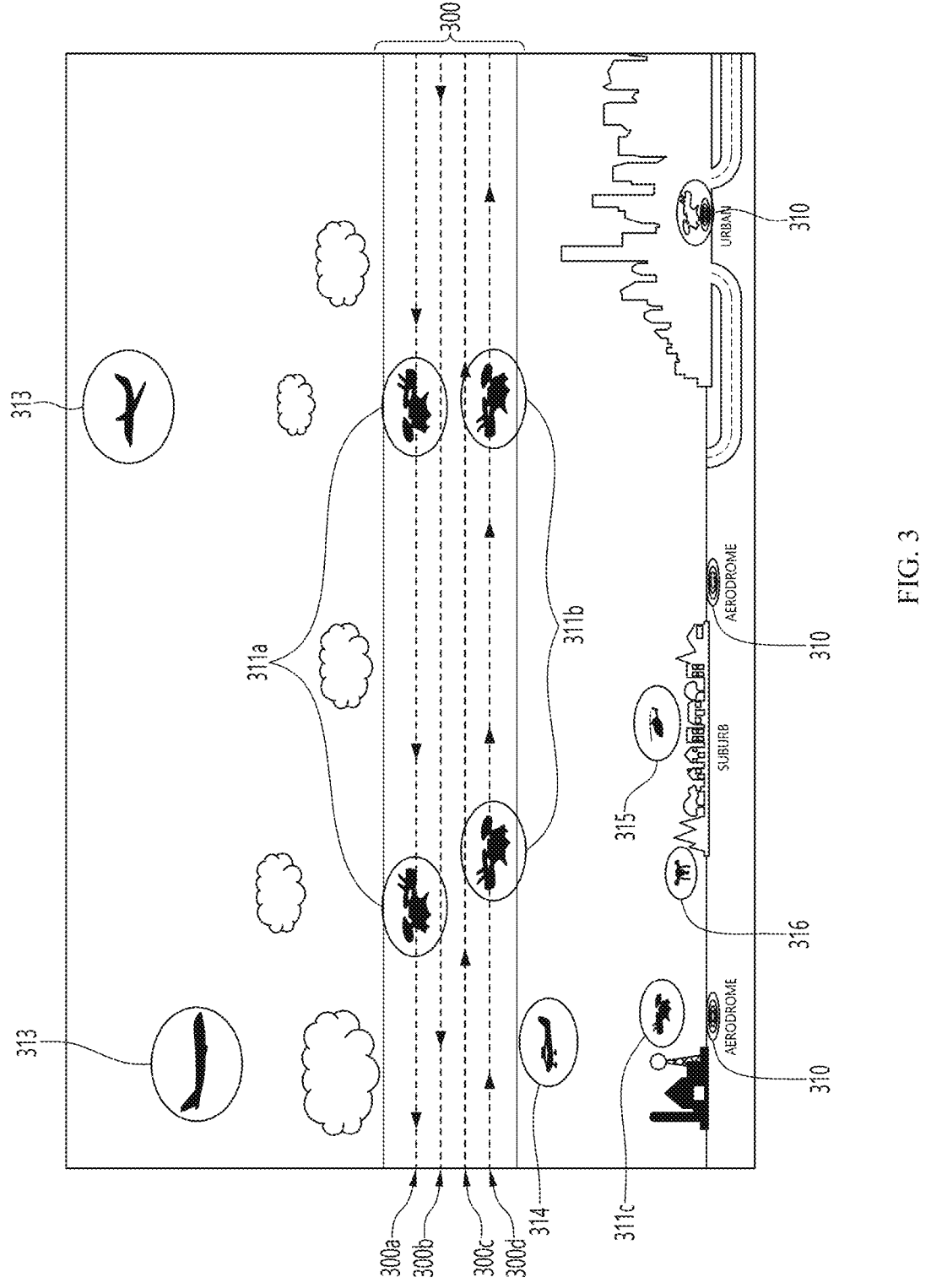
FIG. 3 is a diagram for describing locations of tracks and aerodromes flying by a UAM aerial vehicle in a flight corridor of the UAM according to the embodiment of the present disclosure.
Figure 4:
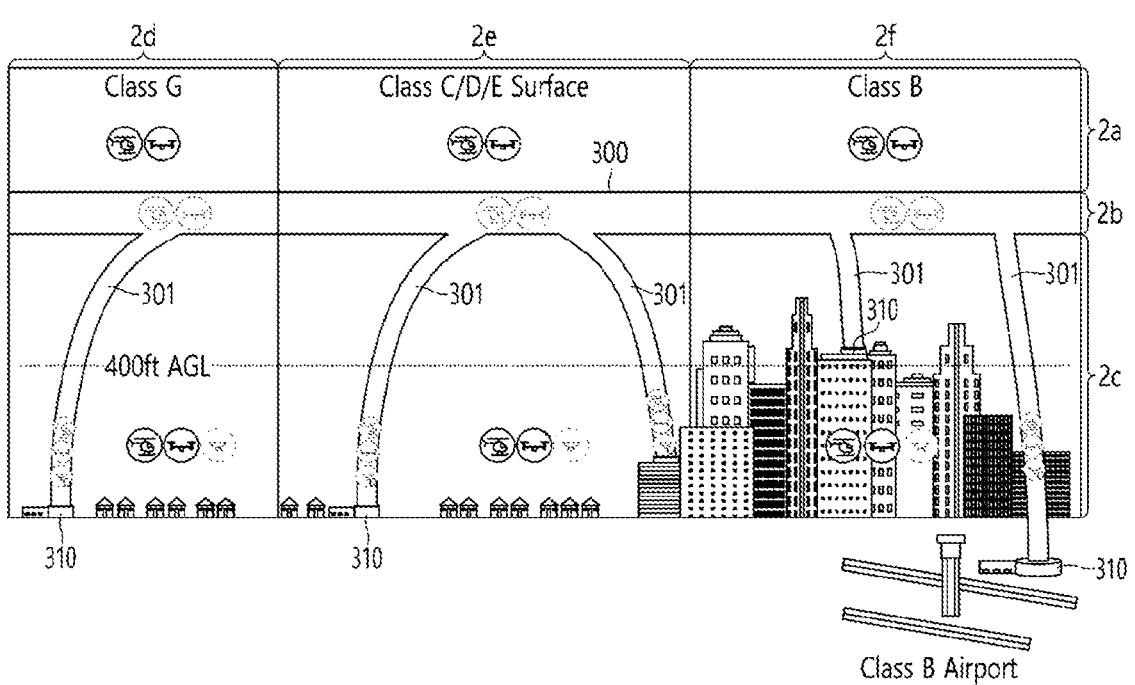
FIGS. 4 and 5 are diagrams illustrating the UAM flight corridor according to the embodiment of the present disclosure.
Figure 5:
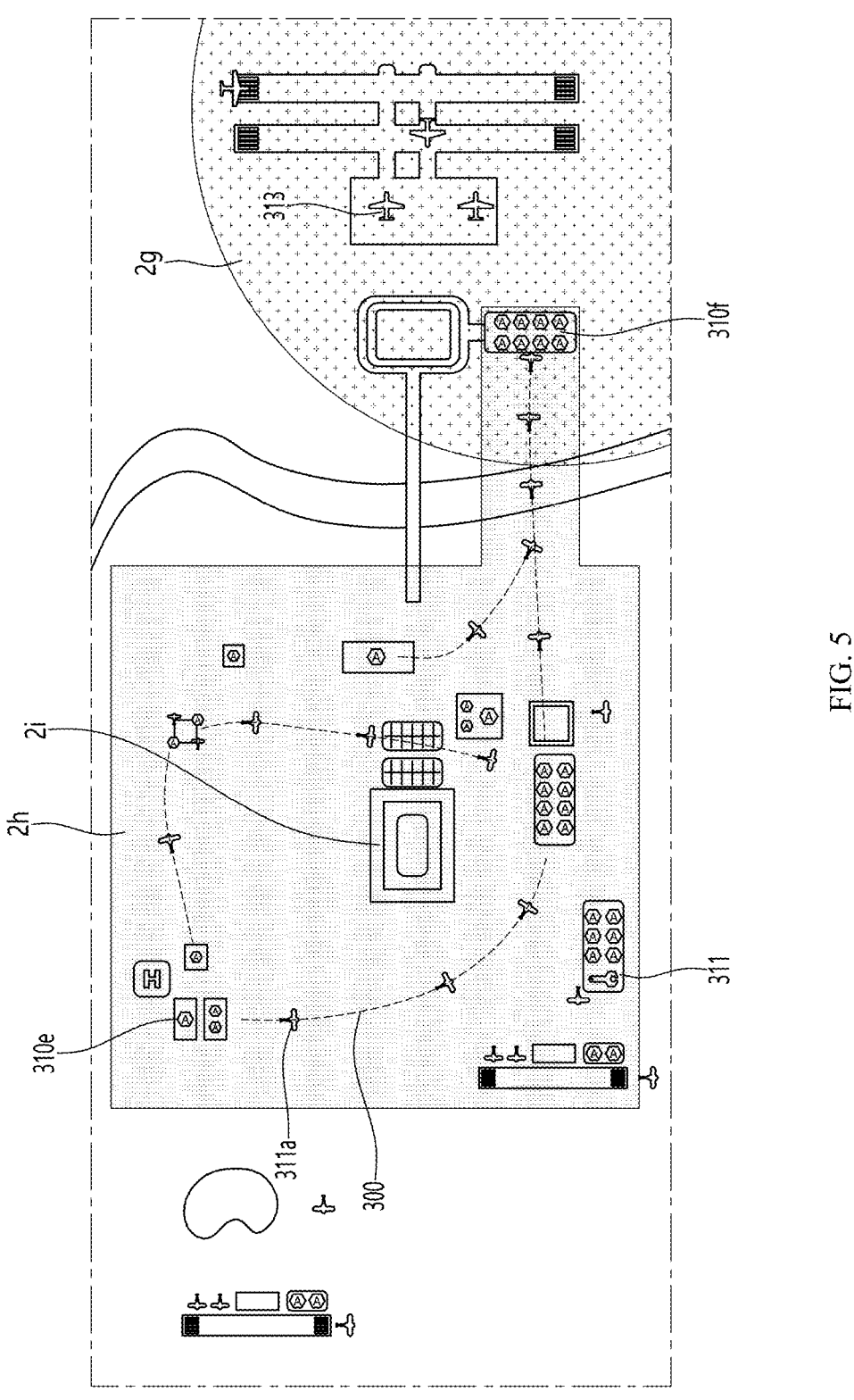

FIG. 3 is a diagram for describing locations of tracks and aerodromes on which UAMs fly within a UAM flight corridor according to an embodiment of the present disclosure, and FIGS. 4 and 5 are diagrams illustrating the UAM flight corridor according to the embodiment of the present disclosure.

It will be described with reference to FIGS. 3 to 5 below.

Referring to FIG. 3, for efficient and safe flight of UAM aerial vehicles 311a and 311b within a UAM flight corridor 300 according to an embodiment of the present disclosure, a plurality of tracks 300a, 300b, 300c, and 300d are provided within the corresponding flight corridor. Each of the tracks 300a, 300b, 300c, and 300d has different altitudes to prevent a collision between the UAM aerial vehicles 311a and 311b, and the number of tracks will be differently set depending on the capacity of the corresponding flight corridor 300.

A UAM aerodrome 310 is an aerodrome that meets capability requirements to support UAM departure and arrival operations. The UAM aerodrome 310 provides current and future resource availability information for UAM operations (e.g., open/closed, pad availability) to support UAM operator planning and PSU strategic conflict resolution. The UAM operator 154 may directly use the UAM aerodrome 310 through the PSU network 206 or through the SDSP 130.

In FIG. 3, the UAM flight corridor 300 should be set to enable the safe and efficient UAM operation without a tactical ATC separation service. Therefore, the UAM flight corridor 300 should be set in relation to the capabilities (e.g., aerial vehicle performance, UAM flight corridor structure, and UAM procedure) of the UAM operator 154.

Additionally, the PSU 102 or the UAM operator 154 may be operated differently within the UAM flight corridor 300 according to operation performance (e.g., aircraft performance envelope, navigation, detection-and-avoidance (DAA)) and participation conditions (e.g., flight intention sharing, conflict resolution within the UAM corridor) of the UAM flight corridor 300.

In addition, the PSU 102 or the UAM operator 154 may set performance and participation requirements of the UAM flight corridor 300 differently between the UAM corridors.

Specifically, the PSU 102 or the UAM operator 154 may variably set the range (flight altitude range) of the UAM flight corridor 300 in consideration of information such as the number of UAM aerial vehicles using the corresponding UAM flight corridor 300, an occupancy request of managements systems (e.g., UTM, ATM) for other aerial vehicles for the corresponding airspace, a prohibited area, and a flight limit altitude.

In addition, the PSU 102 or the UAM operator 154 may share, as the status information for the set UAM flight corridor 300, the UAM flight information (flight time, flight altitude, track ID within the flight corridor, etc.) within the UAM flight corridor with other UAM operators and/or PSUs through the PSU network 206.

Also, the PSU 102 or the UAM operator 154 may set the number of tracks 300a, 300b, 300c, and 300d in the flight corridor according to the range of the UAM flight corridor 300. It is preferable that the corresponding tracks 300a, 300b, 300c, and 300d are defined to have a safe guard set so that the PIC/UAM aerial, vehicle 152 flying along the corresponding tracks does not collide with each other. Here, the safe guard may be set according to the height of the UAM aerial vehicle, or even when the UAM aerial vehicle temporarily deviates from a track assigned thereto due to a bird strike or other reasons, the safe guard may be a space set so as not to collide with other UAM aerial vehicles flying on the nearest neighbor track above and below the corresponding track.

In addition, the PSU 102 or the UAM operator 154 may set the tracks 300a, 300b, 300c, and 300d within the flight corridor according to the range of the UAM flight corridor 300, assign a track identifier (Track ID), which is an identifier in the flight corridor 300 for distinguishing the set tracks, and notify the PIC/UAM aerial vehicle 152 scheduled to fly within the corresponding UAM flight corridor 300 of the assigned track ID.

As a result, the PSU 102 or the UAM operator 154 may monitor in real time whether the PIC/UAM aerial vehicle 152 flying in the corresponding flight corridor 300 are flying along each assigned track ID, and when the PIC/UAM aerial vehicle 152 deviate from the assigned track ID, the PSU 102 or the UAM operator 154 may transmit a warning message to the corresponding PIC/UAM aerial vehicle 152, or remotely control the corresponding PIC/UAM aerial vehicle 152.

In the operating environment of the National Airspace System (NAS), the operation type, regulations and procedures of the airspace may be defined to enable the operation of the aerial vehicle, so the airspace according to the operating environment of the UAM, UTM, and air traffic management (ATM) may be defined as follows.

A UAM aerial vehicle 311 may be operated in the flight corridor 300 set above the area in which the UAM aerodromes 310 are located. In this case, the UAM aerial vehicle 311 may be operated in the above-described operable area based on the performance predefined in designing the airframe.

The unmanned aerial system traffic management (UTM) supports the safe operation of the unmanned aerial system (UAS) in an uncontrolled airspace (class G) below 400 ft (120 m) above ground level (AGL) and controlled airspaces (class B, C, D and, E).

On the other hand, the air traffic management (ATM) may be applied in the whole airspace.

In order to operate the UAM aerial vehicle 311, a fixed-wing aircraft 313, and helicopters 315 inside and outside the UAM flight: corridor 300 according to the embodiment of the present disclosure, all aircrafts within the UAM flight corridor 300 operate under the regulations, procedures and performance requirements of the UAM. The case of the fixed-wing aircraft 313 and the aircraft controlled by the UTM may cross the UAM flight corridor 300.

In addition, it is preferable that the helicopter 315 and the UAM aerial vehicle 311 are operated in the UAM flight corridor 300, and outside the UAM flight corridor 300, in the outside of the UAM flight corridor 300, the helicopter 315 and the UAM aerial vehicle 311 comply with the operation form, the airspace class, and the flight altitude according to the regulations for the air traffic management (ATM) and the regulations for the UTM.

Of course, the same regulations as described above are applied to visual flight rules (VFR) 314 or unmanned drones 316 in which a pilot recognizes surrounding obstacles with his eyes and flies in a state in which a surrounding visual distance is wide.

The operation of each aerial vehicle described above does not depend on the airspace class, and may be applied based on the inside and outside of the flight corridor 300 of the UAM. Meanwhile, the airspace class may be classified according to purpose such as a controlled airspace, an uncontrolled airspace, a governed airspace, and an attention airspace, or classified according to provision of air traffic service.

The UAM flight corridor 300 allows the UAM aerial vehicle to be operated more safely and effectively without the technical separation control service (management of interference with other aerial vehicles for safety) according to the ATM. In addition, it is possible to help accelerate the operating tempo related to the operating capability, structure, and procedures of the UAM aerial vehicle. In addition, in the present disclosure, by defining the UAM flight corridor 300, it is possible to provide a clearer solution to agencies having an interest in the related field.

The UAM flight corridor 300 may be designed to minimize the impact on the existing ATM and UTM operations, and should be designed to not only consider the regional environment, noise, safety, and security, but also satisfy the needs of customers.

In addition, the effectiveness of the UAM flight corridor 300 should be consistent with the operation design (e.g., changing the flight direction during take-off and landing at a nearby airport or setting direct priority between opposing aircraft) of the ATM. Of course, the UAM flight corridor 300 may be designed to connect the locations of the UAM aerodromes 310 located at two different points for point-to-point connection.

The UAM aerial vehicle 311 may fly along a take-off and landing passage 301 connecting the flight corridor 300 in the aerodrome 310 to enter the UAM flight corridor 300, and the take-off and landing passage 301 may also be designed in a way that minimizes the impact on ATM and UTM operations and should be designed in a way that satisfies the requirements of customers as well as considering the regional environment, noise, safety, security, etc.

The airspace or operation separation within the UAM flight corridor 300 may be clarified through a variety of strategies and technologies. As a preferred embodiment for the airspace or operation separation within the UAM flight corridor 300, a collision may be strategically prevented based on a common flight area, and an area may be technically assigned to the UAM operator 154. In this case, in an embodiment of the present disclosure, PIC and aircraft performance or the like may be considered when separating the airspace or operation within the UAM flight corridor 300.

In addition, since the UAM operator 154 is responsible for safely conducting the UAM operation in association with aircraft, weather, terrain and hazards, it is also possible to separate the UAM flight corridor 300 through the shared flight intention/flight plan, awareness, strategic anti-collision, and establishment of procedural rules.

For example, it can be seen that the UAM flight corridor 300 in FIG. 3 is separated into two airspaces based on the flight direction of the UAM aerial vehicle 311a and 311b. In this case, in FIG. 3, in a relatively high airspace within the UAM flight corridor 300, the UAM aerial vehicle 311a may fly in one direction (from right to left), and in a relatively low airspace, the UAM aerial vehicle 311b may fly in a direction (from left to right) opposite to the one direction.

Meanwhile, the UAS service provider (USS) 104 and the SDSP 130 may provide the UAM operator 154 with weather, terrain, and obstacle information data for the UAM operation.

The UAM operator 154 may acquire the data at the flight planning stage to ensure updated strategic management during the UAM operation and flight, and the UAM operator 154 may continuously monitor the weather during the flight based on the data to make a plan or take technical measures to prevent emergencies such as collisions from occurring within the flight corridor.

Accordingly, the UAM operator 154 is responsible for identifying operation conditions or flight hazards that may affect the operation of the UAM, and this information should be collected during flight as well as pre-flight to ensure safe flight.

The PSU 102 may provide other air traffic information scheduled for cross operation within the UAM flight corridor 300, meteorological information such as meteorological wind speed and direction, information on hazards during low altitude flight, information on special airspace status (airspace prohibited areas, etc.), the availability for the UAM flight corridor 300, etc.

In addition, during the UAM operation, the identification information and location information of the UAM aerial vehicle 311 may be acquired through a connected network between the UAM operator 154 and the PSU 102, but is not preferably provided by automatic dependent surveillance-broadcast (ADS-B) or transponder.

Since the operation of UAM ultimately aims at the unmanned autonomous flight, the identification information and location information of the UAM aerial vehicle 311 are acquired or stored by the UAM operator 154 and the PSU 102, and are preferably used for the operation of the UAM.

Meanwhile, referring to FIG. 4, due to the characteristics of UAM that is operated to suit urban and suburban environments, the aerodrome 310 may be installed in several densely populated regions, and each aerodrome 310 may set a take-off and landing passage 301 connected to the UAM flight corridor 300.

The airspace according to the embodiment of the present disclosure may be divided into an airspace 2a of an area in which the fixed-wing aircraft 313 and rotary-wing aircraft 315, etc., are allowed to fly only according to the instrument flight Rules (IFR) vertically depending on altitude, an airspace 2b in which the UAM flight corridor 300 is formed and airspace 2c in which the take-off and landing passage 301 of the UAM aerial vehicle is formed.

The aerial vehicle illustrated in FIG. 4 may be divided into a UAM aerial vehicle (dotted line) flying in the UAM flight corridor 300, an aerial vehicle (solid line) flying in the airspace according to the operating environment of the air traffic management (ATM), and an aerial vehicle (unmanned aircraft system) (UAS) (dashed line) flying at low altitude operated by the unmanned aircraft system traffic management (UTM) operator.

The airspace according to the embodiment of the present disclosure may be horizontally divided into a plurality of airspaces 2d, 2e, and 2f according to the above-described airspace class.

Also, referring to FIG. 5, the airspace may be divided into an airspace 2g divided into an existing air traffic control (ATC) area and an area 2h where UAM operation or control is performed according to the operation or control area. Of course, the ATC control area 2g and the UAM operation or control area 2h may overlap depending on circumstances.

In the area 2h where the UAM operation or control is performed, a plurality of aerodromes 310e and 310f may exist for the point-to-point flight of the UAM aerial vehicle 311, and a prohibited area 2i may be set in the area 2h where the UAM operation or control is performed.

The UAM flight corridor 300 for the point-to-point flight may be set within the area 2h where the UAM operation or control is performed, except for the area set as the prohibited area 2i.

Figure 6:
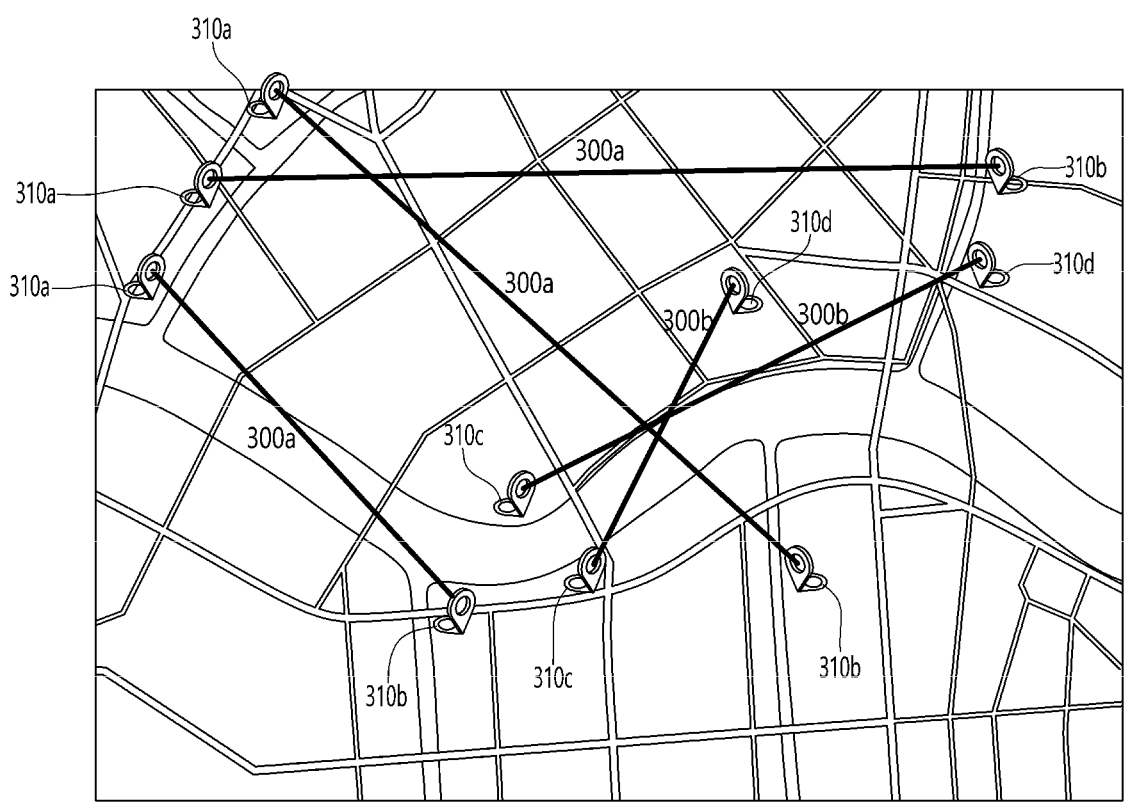
FIG. 6 is a diagram illustrating the flight corridor of UAM for a point to point connection according to an embodiment of the present disclosure.

FIG. 6 is a diagram illustrating the aviation corridor of UAM for the point to point connection according to an embodiment of the present disclosure.

This will be described with reference to FIG. 6 below.

The flight corridors 300a and 300b of the UAM aerial vehicle may connect an aerodrome 310a in one region and an aerodrome 310b in another region. The connection between these points may be established within an area excluding special airspace such as the prohibited area 2i within the area 2h where the above-described UAM operation or control is performed, and the altitude at which the UAM flight corridor 300 is set may be set within the airspace 2b in which the UAM flight corridor 300 is set. Here, the aerodrome 310 may refer to, for example, a vertiport in which an aerial vehicle capable of vertical take-off and landing may take-off and land.

Hereinafter, the operation of the above-described UAM will be described.

The UAM may be operated in consideration with the operation within the UAM flight corridor 300, the strategic airspace separation, the real-time information exchange between the UAM operator 154 and the UAM aerial vehicle 311, the performance conditions of the UAM airframe, etc.

The flight of the UAM may be generally divided into a stage of planning a flight in a pre-flight stage, a take-off stage in which the UAM takes off from the aerodrome 310 and enters a vertical take-off and landing passage 51 and climbs, a climb stage in which the UAM climbs from the aerodrome 310 and enters the flight corridor 300, a cruise stage in which the UAM moves along the flight corridor 300, a descend and landing stage in which the UAM enters the take-off and landing passage 51 from the flight corridor 300, and then, descends and enters the aerodrome 310, a disembarking stage after flight, and operation inspection stage.

The operation in each stage may be performed by being divided into the UAM operator 154, the PSU 102 (or SDSP 130), the FAA, the aerodrome operator, and the PIC/UAM passenger. The PIC/UAM passenger may be understood as a concept including both a person who boards the airframe and controls the airframe and passengers who move through the airframe.

In the pre-flight planning stage, the UAM operator 154 may submit the flight plan to the FAA and confirm the passenger list and destination.

The PSU 102 may remove factors that may hinder flight or plan a strategy for the case where an off-nominal situation occurs.

The FAA may review the flight plan submitted by the UAM operator 154 to determine whether to approve the operational plan, and transmit the determination back to the UAM operator 154.

The aerodrome operator may inspect passengers and cargo, perform boarding of passengers, confirm whether the area around the aerodrome 310 is cleared for departure, and notify the UAM operator 154 and/or the PSU 102 of the information on the confirmed result.

The PIC/UAM passenger may finally confirm all hardware and software systems of the UAM aerial vehicle 311 for departure, and notify the UAM operator 154 and/or the PSU 102 through a communication device.

After the FAA notifies the approval of the UAM operation plan, it maintains the authority for the airspace in which the flight route is established in the PIC/UAM flight, but the UAM operators 154 who actually operate the UAM aerial vehicle and/or the PSU 102 directly control/govern the UAM flight operation, so it is preferable that the FAA does not actively participate in the UAM flight.

In addition, in the take-off stage in which the UAM aerial vehicle takes off the aerodrome 310 and climbs, the UAM operator 154 may approve a taxi request or a take-off request of a runway of an airport of the UAM aerial vehicle and transmit a response message thereto to each UAM.

The PSU 102 may sequentially assign priority to each of the plurality of UAM aerial vehicles to prevent the collision between the UAM aerial vehicles and to smoothly control the aerodrome. The PSU 102 controls and monitors only the UAM aerial vehicle to which priority is assigned to move to the runway or take-off.

Before taking off of the UAM aerial vehicle, the aerodrome operator may confirm the existence of obstacles that hinder the takeoff of the UAM around the aerodrome, and may approve the takeoff of the UAM aerial vehicle if there are no obstacles. The PIC/UAM passenger who has received the take-off approval may proceed with the take-off procedure of the UAM aerial vehicle.

In the climb stage in which the UAM aerial vehicle enters the take-off and landing passage 301 from the aerodrome 310, and then climbs and enters the flight corridor 300 and the cruise stage in which the UAM aerial vehicle moves along the flight corridor 300, the UAM operator 154 monitors whether the PIC/UAM is flying according to the flight plan or whether the overall flight operation plan is being followed. In addition, the UAM operator 154 may monitor the status of the UAM aerial vehicle 311 while exchanging data with the PSU 102 and the UAM aerial vehicle 311 in real time and update information and the like if necessary.

The PSU 102 may also monitor the status of the UAM aerial vehicle 311 while exchanging data with the UAM operator 154 and the UAM aerial vehicle 311 in real time, and may deliver the updated operation plan to the UAM operator 154 and the UAM aerial vehicle 311, if necessary.

When the UAM aerial vehicle 311 enters the cruise stage, the aerodrome operator no longer actively participates in the flight of the UAM aerial vehicle 311. In addition, the PIC/UAM aerial vehicle 311 may execute the take-off and cruise procedures, perform collision avoidance or the like through the V2V data exchange, monitor the system of the aerial vehicle in real time, and provide the UAM operator 154 and the PSU 102 with the information such as the aircraft status.

In the descending and landing stage, since the UAM aerial vehicles 152 and 311 have reached near a destination, the cruise mode is terminated and descends and enters the aerodrome 310 after entering the take-off and landing passage 301 from the flight corridor 300. Even during the descend and landing stage, the UAM operator 154 may continuously monitor the flight status/airframe status of the UAM aerial vehicles 152 and 311 and at the same time, monitor whether the flight of the UAM aerial vehicles 152 and 311 complies with a predefined flight operation plan.

In addition, the UAM aerial vehicles 152 and 311 may be assigned a gate number or gate identification information to land on the aerodrome through communication with the aerodrome operator while entering the take-off and landing passage 301, and confirm whether the current airframe status is ready for landing (landing gear operation, flaps, rotor status, output status, etc.).

The PSU 102 may request the approval of the landing permission of the UAM aerial vehicle 311 from the aerodrome operator, and transmit, to the UAM aerial vehicle 311, information including compliance matters for moving from the current flight corridor or location of the UAM aerial vehicle 311 to the UAM aerodrome 310 permitted to land.

In addition, the UAM aerial vehicle 311 may confirm whether the aerodrome 310 is in a clear status (status in which all elements that may be obstacles to the landing of the UAM aerial vehicle 311 are removed) through communication with the UAM aerodrome 310, the PSU 102, and the UAM operator 154, and after the landing of the UAM aerial vehicle 311 is completed, the UAM aerial vehicle 311, the PSU 102, and the UAM operator 154 may all identify the end of the flight operation of the corresponding UAM aerial vehicle.

When receiving the landing request from the UAM aerial vehicle 311, the aerodrome operator confirms a gate cleared out of the aerodrome. In addition, when the aerodrome operator secures whether the landing is possible for the confirmed gate, the aerodrome operator transmits landing permission message including the gate ID or gate number to the UAM aerial vehicle 311, and assigns a gate corresponding to a landing zone included in the landing permission message to the UAM aerial vehicle 311.

Also, when receiving the landing permission message from the aerodrome operator, the UAM aerial vehicle 311 lands at a gate assigned thereto according to a predetermined landing procedure.

The PIC/UAM passengers may perform the take-off and landing procedure of the UAM aerial vehicle 311, and may perform procedures of preventing collisions with other UAM aerial vehicles while maintaining V2V communication and moving to a runway after landing.

The stage of planning the flight of the UAM aerial vehicle 311 starts with receiving the flight requirements of the UAM aerial vehicle 311 for the UAM operator 154 to fly point to point between the first aerodrome and the second aerodrome. In this case, the UAM operator 154 may receive data (e.g., weather, situation awareness, demand, UAM aerodrome availability, and other data) for the flight of the UAM aerial vehicle 311 from the PSU 102 or SDSP 130.

In all the stages related to the UAM operation, the UAM operator 154 and the PSU 102 not only need to confirm the identification and location information of the UAM aerial vehicle in real time, but also the PIC/UAM and UAM operator 154 needs to monitor the performance/condition of the aerial vehicle in real time to identify whether the flight status of the UAM aerial vehicle 311 is off-nominal.

Meanwhile, the UAM aerial vehicle 311 may have an off-nominal status for various reasons as weather conditions and airframe failure. The off-nominal status may refer to an operating situation in which the UAM aerial vehicle 311 does not follow a flight plan planned before flight due to various external or internal factors.

Two cases may be assumed as the case in which the off-nominal flight condition occurs in the UAM aerial vehicle 311. The first case is a case where the PIC/UAM aerial vehicle 152 intentionally does not comply with UAM regulations due to any other reason, and the second case is the unintentional non-compliance with the UAM operating procedures due to contingencies.

In the first case, it may be assumed that the case where the UAM aerial vehicle 311 intentionally (or systematically) does not comply with the planned UAM operating regulations is the case where the UAM aerial vehicle 311 does not comply with the planned flight operation due to airframe performance problems, strong winds, navigation failure, etc.

However, in the first case, the PIC/UAM aerial vehicle 152 may be in a state in which it may safely arrive at the planned aerodrome 310 within the flight corridor 300.

When the PSU 102 identifies that the off-nominal operation according to the first case has occurred in the PIC/UAM aerial vehicle 152, the PSU 102 distributes, to each stakeholder (UAM operator 154, USS 104, vertiport operator 202, UTM ecosystem 230, ATM operators 204, etc.) through a wired/wireless network, PIC/UAM aerial vehicle off-nominal event occurrence information (UAM aerial vehicle identifier where an off-nominal event occurred, UAM aerial vehicle locations (flight corridor identifier, track identifier), information (event type) notifying a type of off-nominal situations, etc.) notifying that an off-nominal operation status has occurred in the PIC/UAM aerial vehicle 152.

In addition, the UAM operator 154 and the PSU 102 receiving the PIC/UAM aerial vehicle off-nominal event occurrence information may generate a new UAM operation plan that may satisfy UAM community based rules (CBR) and performance requirements for operation within the flight corridor 300, and distribute the generated new UAM operation plan to stakeholders again.

In the second case, the case where the UAM aerial vehicle 152 unintentionally does not comply with the UAM operation due to an accidental situation may be a state in which the forced landing (crash landing) of the UAM aerial vehicle 152 is required, and may be a severe situation where the planned flight operation may not be performed.

That is, the second case is the case where, since it is difficult for the PIC/UAM aerial vehicle 152 to safely fly to the planned aerodrome 310 within the flight corridor 300 assigned thereto, the PIC/UAM aerial vehicle 152 may not fly within the flight corridor 300 assigned thereto.

When the off-nominal operation according to the second case has occurred, similar to the first case, the PSU 102 distributes, to each stakeholder (UAM operator 154, USS 104, vertiport operator 202, UTM ecosystem 230, ATM operators 204, etc.) through the wired/wireless network, the PIC/UAM aerial vehicle off-nominal event occurrence information (UAM aerial vehicle identifier where an off-nominal event occurred, UAM aerial vehicle locations (flight corridor identifier, track identifier), information (event type) notifying a type of off-nominal situations, etc.) notifying that an off-nominal operation status has occurred in the PIC/UAM aerial vehicle 152.

In addition, the PIC/UAM aerial vehicle 152 is reassigned a new flight corridor 300 for flight to a previously secured landing spot and a track identifier within the flight corridor 300 in preparation for an emergency situation in the UAM aerial vehicle, and at the same time, may fly in a flight mode to avoid collision damage with other aerial vehicles through communication means (ADS-B, etc.).

Hereinafter, an evaluation indicator for the operation of the UAM aerial vehicle according to an embodiment of the present disclosure will be described.

As shown in <Table 1> below, UAM operational evaluation indicators may include major indicators such as operation tempo, UAM structure (airspace and procedures), UAM regulatory changes, UAM community regulations (CBR), aircraft automation level, etc.

TABLE 1

| Indicator Item | Description |
|---|---|
| Operation Tempo | It indicates density of UAM operation, frequency of UAM operation, and complexity of UAM operation. |
| UAM Operation Structure (Airspace and Procedure) | It indicates complex level of infrastructure and services supporting UAM operating environment. |
| UAM Operation Regulation | It indicates level of evolution current regulations required for UAM operation structure and performance. |
| UAM Community Laws and Regulations | It indicates rules supplementing UAM operation regulations for UAM operation and expansion of PSU. |
| Aircraft Automation Level | It may be divided into HWTL (Human-Within-The-Loop), HOTL (Human-On-The-Loop), HOVTL (Human-Over-The-Loop). 1) HWTL: Stage where person directly controls UAM system 2) HOTL: Stage of system that is controlled under human supervision, i.e., stage in which human actively monitors 3) HOVTL: Stage in which human performs monitoring passively |

Figure 7:
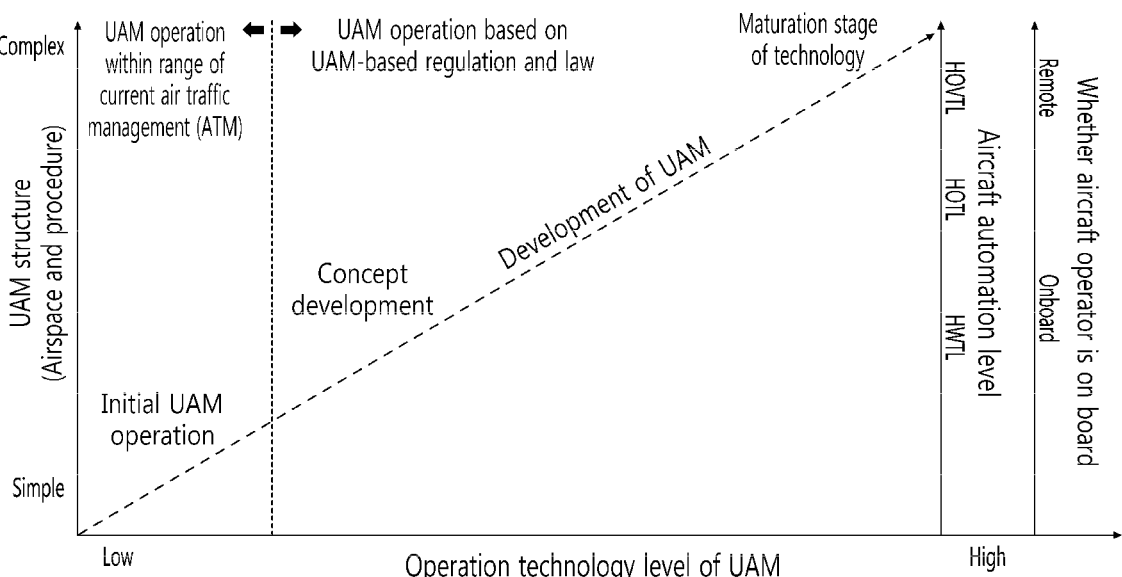
FIG. 7 is a diagram illustrating a development stage of the UAM.

FIG. 7 is a diagram illustrating a development stage of an operating technology level of the UAM.

Hereinafter, concepts of an initial UAM operation stage, a transitional UAM operation stage, and a final UAM operation stage will be described with reference to the above-described key indicators and FIG. 7.

First, in the initial UAM operation stage, the structure of the UAM aerial vehicle is likely to use various existing vertical take-off and landing (VTOL) rotary-wing aircraft infrastructures.

The UAM's regulatory changes may be gradually implemented while complying with aviation regulations and the like under current laws and regulations. However, the UAM community rules (CBR) may not be separately defined.

The aircraft automation level borrows manned rotary-wing technology, which is currently widely used as of the time this specification is written, but an on-board status may be applied to the pilot in command (PIC) stage.

Next, looking at the transitional UAM operation step, in the UAM structure, the UAM airframe may be operated within a specific airspace based on the performance and requirements of the UAM aerial vehicle.

As for UAM regulations, the ATM regulations may be changed and applied, new regulations for UAM that can be operated may be defined, and the UAM community regulations may also be defined.

In the transitional UAM operation stage, the automation level of the UAM aerial vehicle may be capable of PIC control with an airframe designed exclusively for the UAM, but the on-board status may still be maintained as the PIC stage.

Finally, looking at the final UAM operation stage, the UAM airframe may be operated in a specific airspace based on the performance and requirements of the UAM aerial vehicle, but several variables may exist.

It is predicted that the UAM regulation changes will require additional regulations to enable various operations within the UAM flight corridor, and as the complexity of the UAM community regulations increases, FAA guidelines are expected to increase.

Due to the development of artificial intelligence (AI) technology and the development of aviation airframe technology, the aircraft automation level will be realized at a higher automation level compared to the UAM aerial vehicle at the existing stage. As a result, it is predicted that it will reach the unmanned horizontal or vertical take-off or landing technology level, and the PIC stage may be a stage where remote control is possible.

Figure 8:
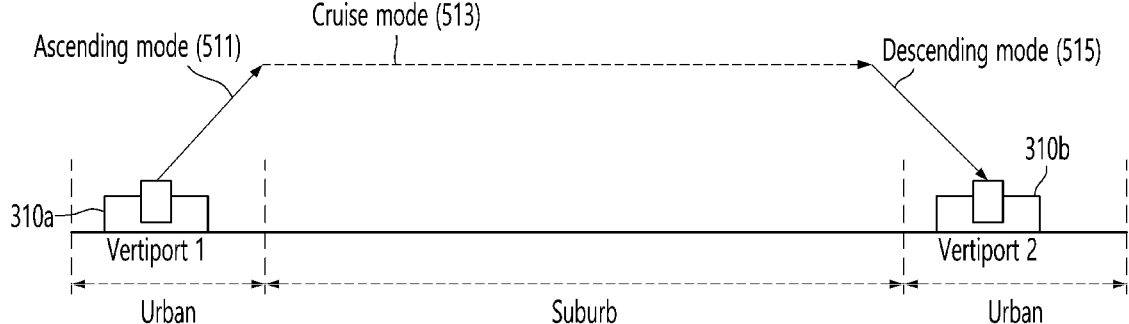
FIG. 8 is a diagram illustrating a flight mode of aerial vehicle according to an exemplary embodiment of the present disclosure.

FIG. 8 is a diagram for describing a flight mode of the UAM aerial vehicle according to an exemplary embodiment of the present disclosure.

Referring to FIG. 8, in an embodiment of the present disclosure, the flight mode of the UAM aerial vehicle may include a take-off mode (not illustrated), an ascending mode 511, a cruise mode 513, a descending mode 515, and a landing mode (not illustrated).

The take-off mode is a mode in which the UAM aerial vehicle takes off from a vertiport 310a at the starting point, the ascending mode 511 is a mode in which the UAM aerial vehicle performs a stage of ascending the flight altitude step by step to enter the cruise altitude, the cruise mode 513 is a mode in which the UAM aerial vehicle flies along the cruise altitude, the descending mode 515 is a mode in which the UAM aerial vehicle performs a stage of descending the altitude step by step in order to land from the cruise altitude to the vertiport 310b of the destination, and the landing stage is a mode in which the UAM aerial vehicle lands on the vertiport 310b of the destination.

In addition, in the take-off mode, the UAM aerial vehicle may perform a taxiing stage to enter the vertiport 310a of the departure point, and even after the landing stage, the UAM aerial vehicle may perform the taxiing stage to enter the vertiport 310b of the destination.

In another embodiment of the present embodiment, in the case of the vertical take-off and landing (VTOL), a take-off mode and the ascending mode 511 may be performed simultaneously, and a landing mode and descending mode 515 may also be performed simultaneously.

In this embodiment, the UAM aerial vehicle is a type of urban transport air transportation means, and the vertiport 310a of the departure point and the vertiport 310b of the destination may be located in the urban area, and according to the cruise mode 513, the aviation corridor on which the UAM aerial vehicle flies may be located in a suburban area outside the urban area.

According to the above-described embodiment of the present disclosure, the take-off mode, the ascending mode 511, the descending mode 515, and the landing mode of the UAM aerial vehicle are performed in a densely populated urban area so thrust may be generated through a distributed electric propulsion (DEP) method to suppress the generation of soot and noise caused by an internal combustion engine.

On the other hand, in the cruise mode 513 of the UAM aerial vehicle, which is mainly performed in the suburban area, the thrust may be generated by an internal combustion engine (ICE) propulsion method in order to increase an operating range, a payload, a flying time, etc.

Of course, the propulsion method for generating the thrust of the UAM aerial vehicle is not necessarily determined for each flight mode described above, and the thrust of the UAM aerial vehicle may be selected by either the DEP method or the ICE method by additionally considering various factors such as the location, altitude, speed, status, and weight of the UAM aerial vehicle.

The operation of the propulsion system according to the flight area of the UAM aerial vehicle according to the embodiment of the present disclosure illustrated in FIG. 8 is summarized in <Table 2> below.

TABLE 2

| Flight Area | Description of propulsion system operation-control |
|---|---|
| Urban | Generate lift and thrust only with battery, not internal combustion engines, in consideration of low noise and eco-friendliness Flight by selecting propulsion unit that may generate thrust/lift as much as data trained in advance through machine learning (ML) rather than full propulsion system, and generating lift/thrust with only selected propulsion unit |
| Suburb | In suburban area, which is less sensitive to noise and eco-friendliness than in urban area, thrust is generated through all propulsion units to enable full power flight for cruise flight, and power is supplied through battery or internal combustion engine |

Figure 9:
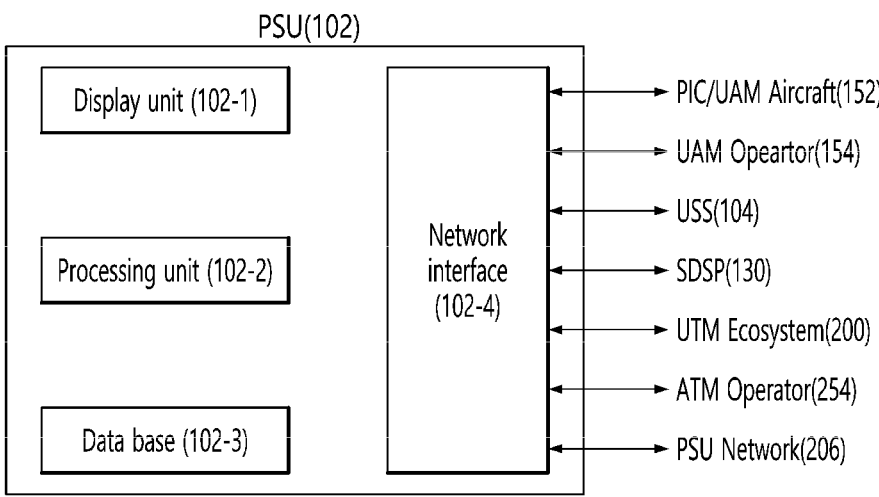
FIG. 9 is a diagram illustrating configurations of a PSU according to an embodiment of the present disclosure.

FIG. 9 illustrates configurations of a PSU 102 according to an embodiment of the present disclosure.

Referring to FIG. 9, the PSU 102 may include a display unit 102-1 that may display a status of each UAM aerial vehicle, flight trajectory information during or before and after flight to a PSU manager, a database 102-3 that may store flight plan information for each UAM aerial vehicle, UAM ID, flight corridor information assigned to each UAM ID, track ID information, information on a vertiport, map data for a 3D space, etc., a network interface 102-4 that transmits and receives data to and from various stakeholders involved in the flight of the UAM aerial vehicle, and a processing unit 102-2 that processes various information and data for the operation of the PSU 102 and controls the operation of the PSU 102.

The PSU 102 may provide a communication bridge between UAMs to support the ability of UAM operators 154 to meet regulations and operational procedures for UAM operation.

More specifically, the PSU 102 may provide a communication bridge with a PIC/UAM aerial vehicle 152, a UAM operator 154, a UAS service provider (USS) 104, a supplemental data service provider (SDSP) 130, a UAM Ecosystem 200, an ATM operator 254 through network interface, and provide a communication bridge, and also provide a communication bridge from one PSU to another PSU via the PSU network 206.

Figure 10:
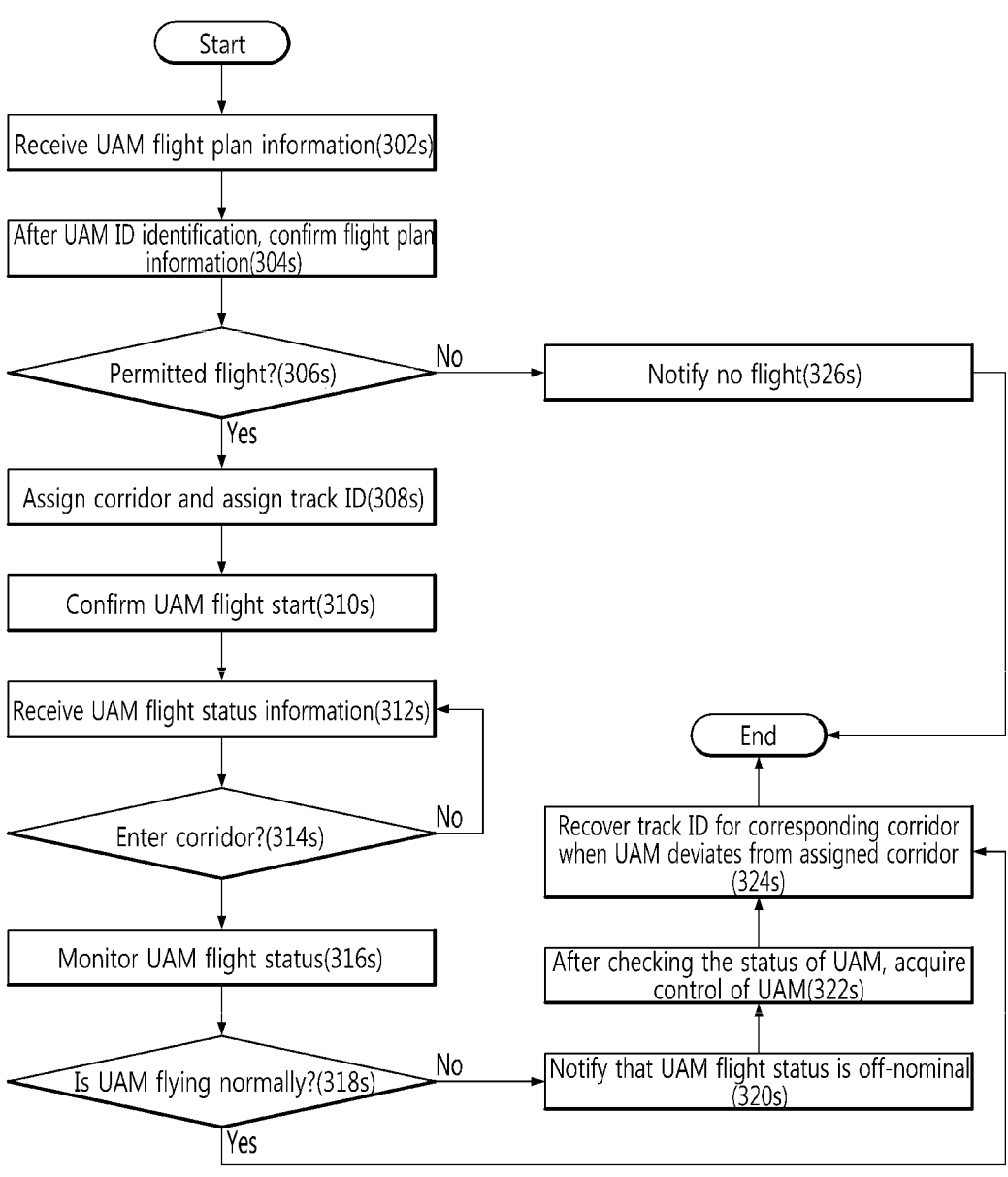
FIGS. 10 and 11 are flowcharts illustrating a flight control process through communication between a PSU and a UAM according to an embodiment of the present disclosure.

FIG. 10 is a flowchart illustrating a flight control process through communication between a PSU and a UAM from the viewpoint of the PSU according to an embodiment of the present disclosure. The PSU 102 may receive UAM flight plan information (302s), identify the UAM through the ID of the UAM, and then confirm the flight plan information of the identified UAM (304s).

In addition, the PSU 102 may determine whether the identified UAM flight plan is a previously authorized flight (306s), and when the flight is not previously authorized (306s: NO), notify the UAM of no-fly (326s).

On the other hand, when the flight plan of the identified UAM is a previously authorized flight (306s: YES), the PSU 102 may assign the flight corridor and track ID (308s), and then notify the flight start of the UAM or confirm the UAM flight start of the corresponding UAM (310s) in consideration of the specifications of the identified UAM, flight performance, status, flight current corridor occupancy, etc.

Meanwhile, after the UAM starts flying, the PSU 102 may receive flight status information of the UAM (312s) and determine whether the UAM enters the assigned flight corridor (314s). When the UAM enters the assigned flight corridor (314s, YES), the PSU 102 may monitor the flight status of the UAM (316s).

However, when the UAM does not enter the assigned flight corridor (314s, NO), the PSU 102 may receive the flight status information of the UAM (312s).

In addition, the PSU 102 may determine whether the UAM is in normal flight while monitoring the flight status of the UAM (318s), and when it is determined that an off-nominal situation has occurred in UAM (318s: NO), the PSU 102 may notify various stakeholders such as the UAM aerial vehicle 152, the UAM operator 154, the UAS service provider (USS) 104, the supplemental data service provider (SDSP) 130, the UAM Ecosystem 200, the ATM operator 254, and other PSUs that the UAM flight status is off-nominal (320s).

The PSU 102 may confirm the current status of the UAM aerial vehicle 152 and then acquire an operation floor control of the UAM aerial vehicle 152 according to the situation (322s) to control the UAM aerial vehicle 152.

When the UAM aerial vehicle 152 deviates from the assigned flight corridor, the PSU 102 may recover the track ID for the corresponding flight corridor (324s).

However, when it is determined that the UAM aerial vehicle 152 is in a normal flight (318s: YES), the PSU 102 determines whether the UAM aerial vehicle 152 deviates from the assigned flight corridor, and when it is determined that the UAM aerial vehicle 152 deviates from the assigned flight corridor, the PSU 102 may recover the track ID (324s).

FIG. 10 has been described as being performed by the PSU 102, but this is just an example and may be performed by the UAM operator 154.

Figure 11:
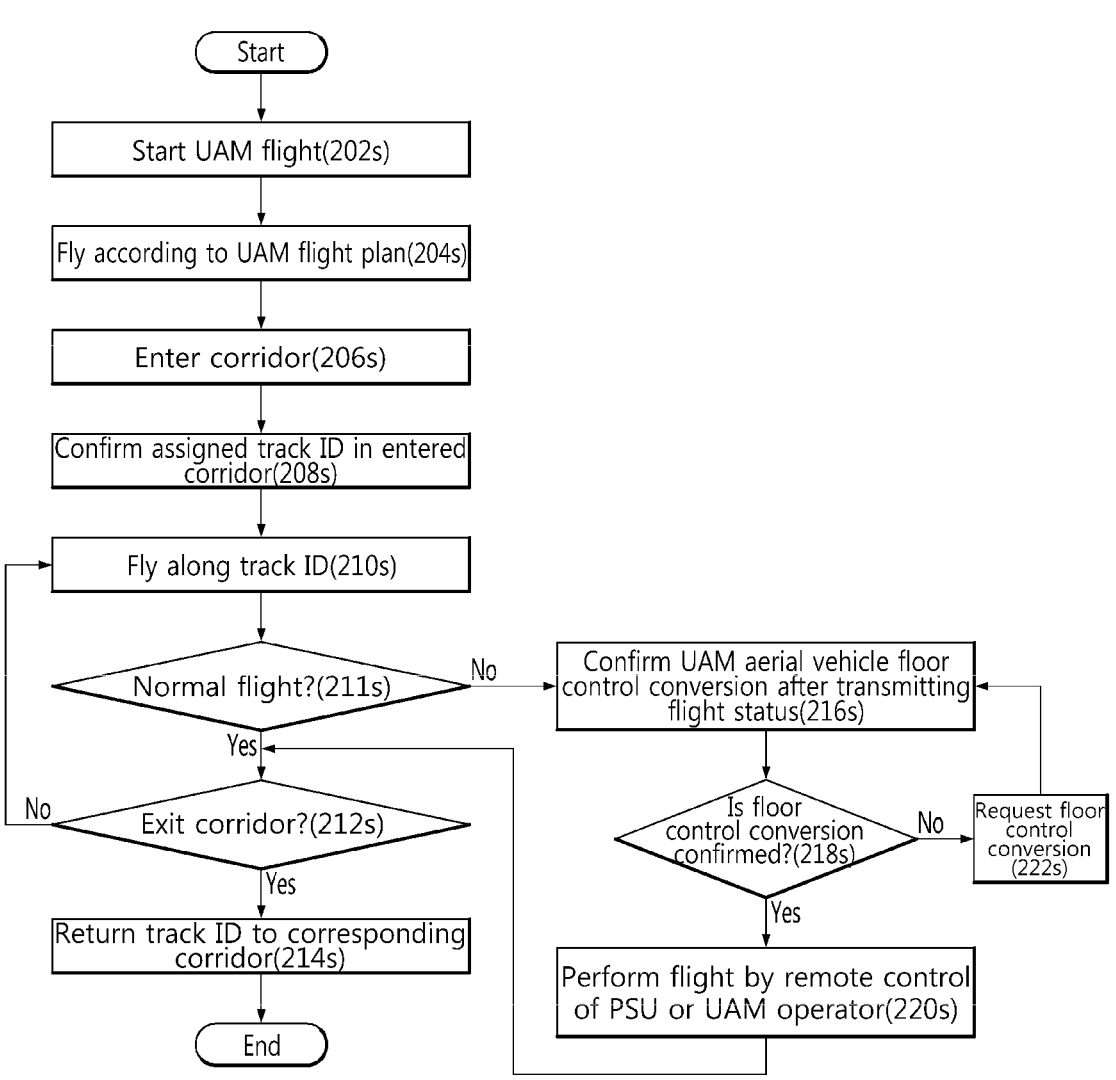

FIG. 11 is a flowchart illustrating a flight control process through communication between a PSU and a UAM from the viewpoint of the UAM aerial vehicle 152 according to an embodiment of the present disclosure.

After the UAM aerial vehicle 152 starts flying (202*s*), the UAM aerial vehicle 152 may perform a flight according to a pre-planned flight plan (204*s*). The flight starting step (202*s*) may be defined as any one of the flight modes (flight stage) before entering the flight corridor, such as taxiing and takeoff of the UAM aerial vehicle 152 or a series of processes.

Meanwhile, the UAM aerial vehicle 152 may sequentially perform a step of entering the flight corridor assigned from the PSU 102 (206*s*) and then confirming the assigned track ID in the entered flight corridor (208*s*).

In addition, the UAM aerial vehicle 152 determines whether the flight is normally performed within the pre-planned flight plan while flying (210*s*) according to the assigned track ID (211*s*), and sends the determined result to the UAM operator 154 and/or to the PSU 102 in real time.

When the off-nominal situation occurs (211*s*: NO), the UAM aerial vehicle 152 transmits the flight status to the PSU 102 or the UAM operator 154, and then confirms whether to convert the floor control of the corresponding UAM aerial vehicle 152 (S216*s*). When the floor control conversion of the UAM aerial vehicle 152 is not completed (218: No), the UAM aerial vehicle 152 may perform the floor control conversion request (222*s*) again. However, when the floor control conversion is completed (218*s*: YES), the floor control of the UAM aerial vehicle 152 may be converted to the PSU 102 or the UAM operator 154, and the UAM aerial vehicle 152 may fly by remote control (220*s*).

The UAM aerial vehicle 152 may determine whether the UAM aerial vehicle 152 has entered the flight corridor for flight to a preset safety zone during flight by the remote control of the PSU 102 or the UAM operator 154 (212*s*). When the UAM aerial vehicle 152 enters the flight corridor (212*s*: YES), a flight corridor identifier which is an identifier for the corresponding flight corridor and the track ID within the corresponding flight corridor may return to the PSU 102 (214*s*). On the other hand, when the UAM aerial vehicle 152 does not enter the flight corridor (212*s*: NO), the UAM aerial vehicle 152 determines that the current altitude, location, etc., of the UAM aerial vehicle 152 do not secure a flight corridor to safely fly to the preset safety zone, so the pre-planned flight may be continued according to the previously assigned track ID (210*s*).

On the other hand, in the above step (211*s*), when the UAM aerial vehicle 152 is normally flying (211*s*: YES), it may be determined whether the UAM aerial vehicle 152 enters along the flight corridor determined based on its altitude and location information measured in real time. When the UAM aerial vehicle 152 deviates from the flight corridor during the normal flight, it may be the case that the cruise mode is terminated and the descending mode and landing mode for landing on the vertiport are entered.

When the UAM aerial vehicle 152 enters the flight corridor (212*s*: YES), the UAM aerial vehicle 152 may return the track ID for the corresponding flight corridor to the PSU 102 (214*s*). However, when the UAM aerial vehicle 152 does not enter the flight corridor (212*s*: NO), the UAM aerial vehicle 152 may continue to perform the pre-planned flight according to the track ID (210*s*).

Figure 12:
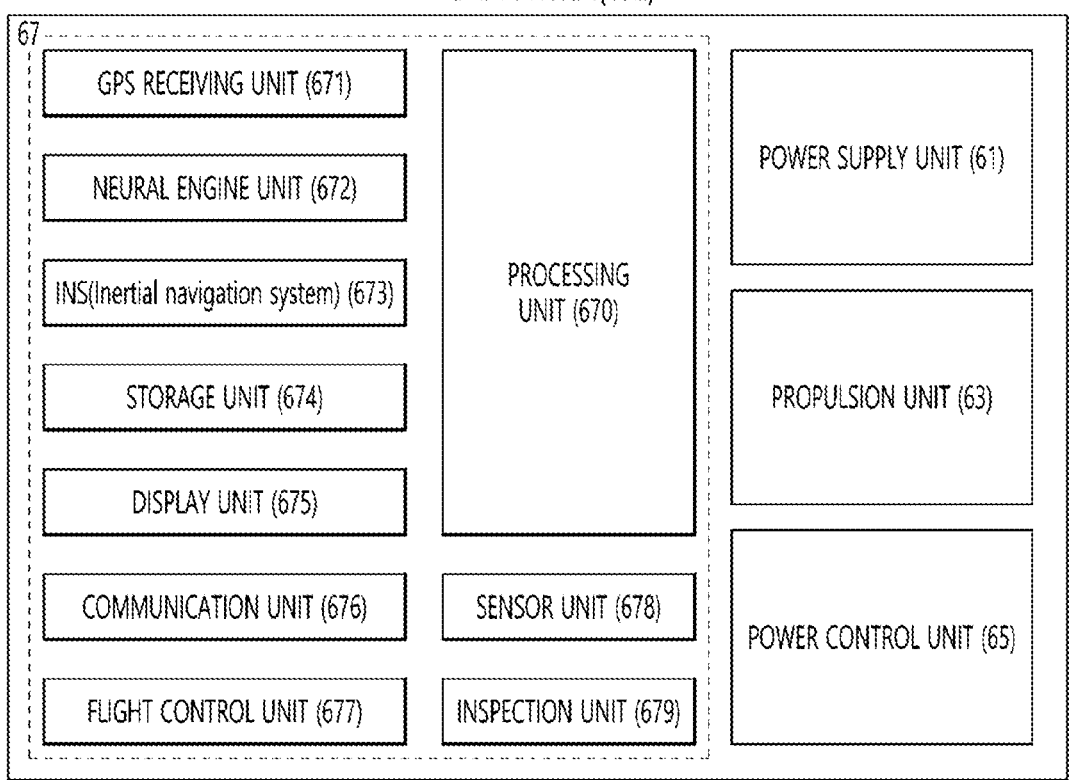
FIGS. 12 to 15 are diagrams illustrating configurations of an aerial vehicle using a hybrid distributed propulsion system according to an exemplary embodiment of the present disclosure.
Figure 13:
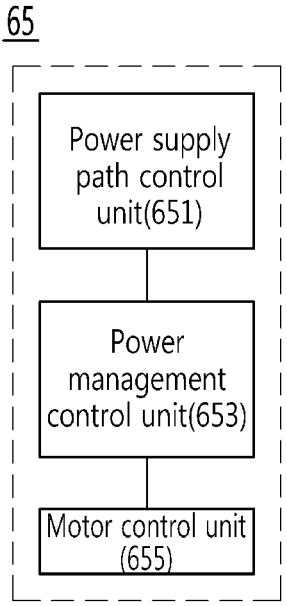

FIG. 12 is a block configuration diagram of the UAM aerial vehicle to which the hybrid distributed propulsion system according to the embodiment of the present disclosure is applied, and FIG. 13 is a detailed block configuration diagram of a power control unit 65 according to an embodiment of the present disclosure.

Referring to FIGS. 12 and 13, the UAM aerial vehicle 152 may include a power supply unit 61, a propulsion system 63, a power control unit 65, and a flight control system (FCS) 67.

The propulsion system 63 of the UAM aerial vehicle 152 according to the present embodiment may include a thrust generating unit 182 including a plurality of propulsion units 1302 to 1310.

In FIG. 12, the flight control system (FCS) 67 may control the attitude, route setting, output, etc., of the UAM aerial vehicle through a steering control signal (input signals related to 4-axis control, such as pitch, roll, collective, and yaw of the UAM aerial vehicle) input to control a flight control surface of the UAM aerial vehicle 152 and a steering control signal input through autopilot program, etc., of the UAM aerial vehicle 152.

In addition, the FCS 67 may process control and operation of various blocks constituting the UAM aerial vehicle 152.

The FCS 67 may include all or part of a processing unit 670, a GPS receiving unit 671, a neural engine unit (NEU) 672, an inertial navigation system (INS) 673, a storage unit 674, a display unit 675, a communication unit 676, a flight control unit (FCU) 677, a sensor unit 678, and an inspection unit 679.

The flight control system 67 may determine the current location of the UAM aerial vehicle using signals received from GPS satellites through the GPS receiver 671.

The UAM aerial vehicle 152 of the present embodiment transmits and receives data necessary for flight to and from the UAM operator 154, the PSU 102, the vertiport operator 202, and other UAM aerial vehicle through the communication unit 676, thereby performing operations such as mid-air collision avoidance, obstacle detection, rescue request when emergency occurs, and flight through remote control.

Data transmitted and received to and from the UAM operator 154, the PSU 102, and other aerial vehicle (which may include all aerial vehicles flying in an airspace such as UAM aerial vehicle, ATM, and UAV) may include at least one of weather information on a flight zone such as flight corridors of other aerial vehicles, no-flight zone (NFZ) information, and flight information (location, altitude, direction, speed, route identifier, and aerial vehicle identifier) of other aerial vehicles.

In addition, the processing unit 670 may control output through the display unit 675 in the case of information that directly and/or indirectly affects UAM flight among the information acquired through the communication unit 676.

In addition, the processing unit 670 confirms the thrust generating direction (tilting angle, etc.) of the at least one propulsion unit, the processing unit determines the required power required for the operation of the electric motors based on the confirmed thrust generating direction of at least one propulsion unit and notifies the power control unit 65 of the determined power, and the power control unit 65 selects a power source to generate the requested power.

The storage unit 674 may store information such as various types of flight information related to the flight of the UAM aerial vehicle 152, flight plan, flight corridor information assigned from the PSU 102 or UAM operator 154, track ID information, UAM flight data, and map data. Here, the flight information of the UAM aerial vehicle 152 stored in the storage unit 674 may include location information, altitude information, speed information, flight control surface control signal information, propulsion control signal information, and the like of the UAM aerial vehicle.

In addition, the storage unit 674 may store a navigation map, traveling information, etc., necessary for the UAM aerial vehicle 152 to travel from a departure point to a destination.

The neural engine unit (NEU) 672 may be implemented as a form of a neural processing unit (NPU), and may include an AI accelerator that accelerates learning using an artificial neural network such as a convolution neural network (CNN) to implement artificial intelligence (AI), machine learning, and deep learning.

The NEU 672 may determine/predict a failure or the possibility of failure of each component of the UAM aerial vehicle 152 using an already learned training data set.

According to an embodiment of the present disclosure, the training data set used by the NEU 672 may be generated by a failure occurrence period, a failure occurrence frequency, parts replacement cycle, status information before failure occurrence, etc., of each component of the UAM aerial vehicle 152, and may be generated through comparison with the inspected result data performed on each component of the UAM aerial vehicle 152.

In addition, the NEU 672 selects the propulsion units of the propulsion system 63 that will generate the thrust/lift necessary for the flight of the UAM aerial vehicle 152 in consideration of at least one of a flight distance of the UAM aerial vehicle 152, a load of the UAM aerial vehicle 152, the amount of fuel, a battery capacity, and rotations per minute (RPM) of the propulsion unit when flying in the urban or suburban area based on the training data, and infers information for controlling rotation speeds of fans/rotors/propellers of the selected propulsion units and performs the neural network processing to output the inferred information.

The inspection unit 679 may compare the inspected result data obtained by inspecting each component or system of the UAM aerial vehicle 152 with the preset result data to predict the possibility of fail of each component or system or to identify whether to predict the occurrence of fail.

The inspection unit 679 may compare the components of the power control unit 65, the propulsion system 63, the power supply unit 61, and the control surface with the preset result data, and sequentially inspect each configuration. In addition, the processing unit 670 controls the inspection unit 679 to display the process of performing the inspection on each component or the result thereof to a pilot through the display unit 675, so the pilot may identify the normal operation status for each component of the pre-flight UAM aerial vehicle 152.

The sensor unit 678 may include an external sensor module and an internal sensor module, and may measure the environment inside and outside the UAM aerial vehicle 152. For example, the internal sensor module may measure the pressure, oxygen content, and the like inside the UAM aerial vehicle 152. The external sensor module may include an altimeter, Radio Detection And Ranging (RADAR), Light Detection and Ranging (LIDAR), an ultra-sonic sensor, an image sensor, etc., and may measure the altitude of the UAM aerial vehicle 152, the presence or absence of objects around the UAM aerial vehicle 152, a distance between the surrounding objects and the UAM aerial vehicle 152, etc., and provide the measured data to the processing unit 670.

The inertial navigation system 673 has a configuration in which a reference table maintaining a constant attitude with respect to an inertial space is generated using a gyro sensor and a precise accelerometer is installed on the generated reference table, and may calculate a flight distance through acceleration during the flight of the UAM aerial vehicle 152 to measure the current location of the UAM aerial vehicle 152 even in a situation where GPS signals are not received.

The FCU 677 may generate a control signal for controlling the attitude and thrust of the UAM aerial vehicle 152 by the control signal of the processing unit 670. More specifically, the FCU 677 generates a control signal for controlling the propulsion system 63 to generate flight power (thrust, lift, etc.) required for the flight of the UAM aerial vehicle 152.

In one embodiment, when the UAM aerial vehicle 152 is a fixed-wing aircraft, the FCU 677 controls an aileron control signal to control the movement of the UAM aerial vehicle 152 in the roll direction. An elevator control signal may be generated to control the movement in the pitch direction, and a rudder control signal may be generated to control the movement in the yaw direction.

On the other hand, when the UAM aerial vehicle 152 is a rotary-wing aircraft, the FCU 677 generates a control signal for adjusting the RPM, pitch angle, etc., of the rotor or propeller to control the rolling in the roll direction, pitching in the pitch direction, and yawing in the yaw direction of the UAM aerial vehicle 152.

Specifically, when the UAM aerial vehicle 152 is the rotary-wing aircraft, the FCS 67 may control the rotation in the roll direction by adjusting the rotational speed of the rotors/propellers located on the left and right sides in the airframe traveling direction if the roll phenomenon occurs in the UAM aerial vehicle 152, control the rotation in the pitch direction by adjusting the rotational speed of the rotor/propeller located before and after the airframe traveling direction if the pitch phenomenon occurs, and control the rotation in the yaw direction by adjusting the rotational speed of the rotor/propeller rotating in the direction in which the yaw phenomenon occurs if the yaw phenomenon occurs.

On the other hand, when the pitch angle of the rotor/propeller/fan of the propulsion units 1302 to 1316 of the thrust generating unit 1330 of the UAM aerial vehicle 152 is in the form of an adjustable variable pitch, the FCS 67 may generate a pitch angle control signal for adjusting the pitch angle of the thrust generating means (rotor/propeller/fan) of each of the propulsion units 1302 to 1316 to control the flight attitude of the UAM aerial vehicle 152.

As another embodiment, when a situation requiring the remote control of the UAM aerial vehicle 152 occurs, the FCS 67 receives a propulsion power control signal from the UAM operator 154 or the PSU 102, a flight control surface control signal, etc., to control the flight power/control surface of the UAM aerial vehicle 152.

In addition, the FCU 677 may control the operation of the power control unit 65. Specifically, the power control unit 65 may include a power supply path control unit 651, a power management control unit 653, and a motor control unit 655.

The power supply path control unit 651 may select at least one of a generator or a battery unit as a power source for supplying power to at least one of the plurality of propulsion units 1302 to 1316.

As an example of supplying power to the plurality of propulsion units 1302 to 1316, the power supply path control unit 651 is selected to generate a power supply path selection signal to receive power required for thrust/lift generation of the UAM aerial vehicle from any one of the generator 613 or the battery unit 614. In addition, the power supply path controller 651 may monitor the RPM of the fan/propeller/ rotor of the propulsion unit generating the thrust/lift of the UAM aerial vehicle in real time to control the fan/propeller/rotor of each propulsion unit to rotate at the same RPM.

In this case, the power supply control unit 651 may monitor the status of the selected propulsion unit for the thrust/lift generation, and when a fail occurs in one or more selected propulsion units, determine whether there is an inoperative propulsion unit to select an inoperative propulsion unit as a replacement propulsion unit to replace the failed propulsion unit, so the alternative propulsion unit supplies the thrust/lift instead of the failed propulsion unit.

On the other hand, in a state in which the fail occurs in one of at least one or more selected propulsion units, when there is no inoperative propulsion unit (i.e., in a state in which all propulsion units are in operation), the power supply path control unit 651 may calculate additional thrust/lift required to offset insufficient thrust/lift due to the failed propulsion unit, and control to increase the RPM of the propulsion units during normal operation to further generate the calculated thrust/lift.

In spite of increasing the RPM of the propulsion units in the normal operation, when it is impossible to offset the insufficient thrust/lift due to the failed propulsion unit, the processing unit 670 may perform an emergency landing procedure of the UAM aerial vehicle 152.

The power management control unit 653 may calculate the thrust, power, energy, etc., required for the mission of the UAM aerial vehicle 152, and determine whether the required power may be supplied from the generator and/or battery unit 614 based on the calculated data.

Figure 14:
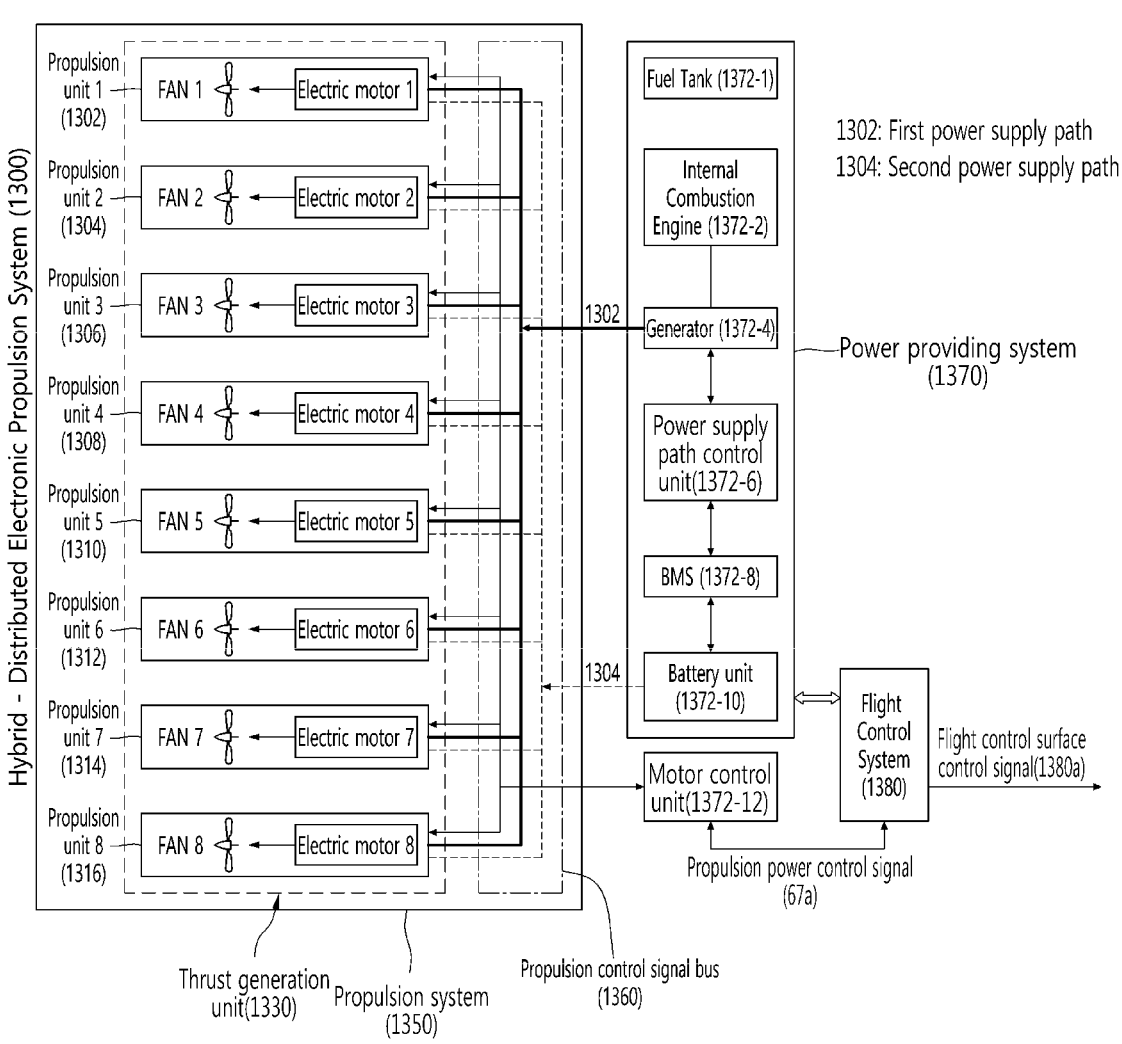

The motor control unit 655 may generate lift, thrust, etc., necessary for flight of the UAM aerial vehicle 152 by controlling the propulsion units 1302 to 1316 of the UAM aerial vehicle to which the hybrid distributed system illustrated in FIG. 14 is applied.

FIG. 14 is a block configuration diagram of UAM aerial vehicle to which a hybrid distributed propulsion system 1300 according to an embodiment of the present disclosure is applied.

Referring to FIG. 14, in an embodiment of the present disclosure, each of the plurality of propulsion units 1302 to 1310 may include, for example, fans FAN 1 to FAN 8 to generate the thrust/lift and electric motors (electric motors 1 to 8) generating power for rotating the fans.

A plurality of propulsion units 1302 to 1310 are means of generating the thrust/lift of UAM aerial vehicle 152, and various structures such as fans, rotors, or propellers may be applied.

Each of the electric motors 1 to 8 included in the thrust generating unit 1330 may receive power through the power providing system 1370. In addition, the control of each operation (rotations per minute, operation command) of electric motors (electric motors 1 to 8) may be performed through the motor control signal output from the motor control unit 1372-12.

In addition, according to the embodiment of the present disclosure, the power providing system 1370 may generate a flight power selection signal that may select at least one of power generated through an internal combustion engine 1372-2 or power generated through electrical energy charged in a battery unit 1372-10 as power for driving each electric motor (electric motors 1 to 8) included in the plurality of propulsion units 1302 to 1316 included in the thrust generator 1330, and output the generated flight power selection signal to the propulsion system 1350.

More specifically, the power providing system 1370 may include a fuel storage unit 1372-1, an internal combustion engine 1372-2, a generator 1372-4, a power supply path control unit 1372-6, a battery management system (BMS) 1372-8, and a battery unit 1372-10.

Fuel (for example, jet fuel or diesel) necessary for the operation of the UAM aerial vehicle 152 may be stored in the fuel storage unit 1372-1.

The fuel required for the operation of UAM aerial vehicle may include 1) taxi fuel required for taxiing, 2) trip fuel required for one landing approach and one missed approach, flying from a departure point to a destination, 3) destination ALT fuel required to fly to a landing point in the event of an emergency near the destination, 4) holding fuel required for UAM aerial vehicle to be held in the air for a certain amount of time due to landing permission, control permission, or the like at a destination landing point, 5) additional fuel required to prepare for failure of an engine and pressurizer, etc., and 6) contingency fuel that additionally loads a certain percentage of trip fuel to prepare for emergencies, and the like.

The above-described type of fuel is one type for calculating the fuel required for the operation of the aerial vehicle, and is not limited to the above-described type, and the amount of fuel stored in the fuel storage unit 1372-1 may be determined in consideration of the sum of the total energy sufficient to generate the thrust/lift of the propulsion system 1350 together with the maximum charge capacity of the battery unit 614 in order for the UAM aerial vehicle 152 to reach from the departure point to the destination.

The internal combustion engine 1372-2 burns fuel stored in the fuel storage unit 1372-1 to generate power to drive a generator 1372-4, and the generator 1372-4 may generate electricity from power generated by the internal combustion engine 1372-2 and provide the electricity to the propulsion system 1350.

The battery unit 1372-10 includes a plurality of battery cells that may be used by charging and discharging electrical energy, and a battery management system (BMS) 1372-8 that may monitor the temperature of each battery cell, the quantity of electric charge of each battery cell, and the like.

In addition, the BMS 1372-8 of the battery unit 1372-10 may control electricity supplied from the generator 1372-4 to be charged in each of the battery cells or electricity supplied from an external power source to charge in consideration of the status of each battery cell.

In detail, the BMS 1372-8 may monitor the status of the battery unit 1372-10 and control the battery unit 1372-10. The BMS 1372-8 may control the state of charge of the plurality of battery cells included in the battery unit 1372-10 and the voltage of each cell to be equal. Also, the BMS 1372-8 may control the temperature of the battery unit 1372-10 using a cell heating module and a cell cooling module of the temperature control module. In one embodiment, in order to maintain performance of the battery unit 1372-10, the BMS 1372-8 may control the temperature of the battery unit 1372-10 in consideration of a change in altitude of the UAM aerial vehicle.

Also, the BMS 1372-8 may prevent overcharging of the battery unit 1372-10. In one embodiment, the battery unit 1372-10 may measure the level of current supplied from battery unit 1372-10 to the propulsion units 1302-1316.

In addition, the BMS 1372-8 may estimate a state of health, a state of charge, a state of function, and the like of the plurality of battery cells in the battery unit 1372-10. Here, the state of health may indicate how much the performance of the battery cell has deteriorated compared to the time of manufacture, the state of charge may indicate the information on the amount of charge accommodated in the battery cell, and the state of function may indicate how well the performance of the battery cell meets predetermined conditions. In addition, the BMS 1372-8 may provide the state of health, the state of charge, and the state of function to the processing unit 670.

In addition, the NEU 672 according to the embodiment of the present disclosure may select propulsion units that may provide the optimal flight power to the UAM aerial vehicle according to the neural network pre-trained through parameters such as the flight location of the UAM aerial vehicle, the flight status, the status of each propulsion unit, the battery unit capacity, the amount of fuel, and the status of the internal combustion engine, and provide the selected propulsion units to the processing unit 670.

Specifically, when the flight mode of the UAM aerial vehicle 152 is the cruise mode, the current location is in the suburban area, and the charging capacity and/or fuel amount of the battery unit is sufficient to generate maximum thrust, the NEU 672 may provide the learning result data to the processing unit 670 to maximize the rotations per minute of all the propulsion units mounted on the UAM aerial vehicle 152 in order to generate the thrust at full power.

On the other hand, when the location of the UAM aerial vehicle 152 is the urban area, the NEU 672 may compare parameters such as the weight of the current UAM aerial vehicle, the charging capacity of the battery unit, and the thrust generation status of each propulsion unit with the pre-trained data to provide the learning result data to the processing unit 670 in order to select the optimal propulsion unit in the current status of the UAM aerial vehicle 152.

In addition, the communication unit 676 of the UAM aerial vehicle 152 may perform cellular communication with a base station (eNode B) on the ground, and even if a GPS signal communicating with the communication unit 676 is not received, the processing unit 670 may determine the location of the UAM aerial vehicle 152 through a base station identifier (eNode B ID) and a relative location with the base station.

In addition, the communication unit 676 of the UAM aerial vehicle 152 may perform communication with a low earth orbit (LEO) and a geostationary orbit (GEO), and serve as a gateway node B (gNode B) of a non-terrestrial network connected to a terrestrial network of the eNode B.

In an embodiment of the present disclosure, more specifically, the UAM aerial vehicle 152 may calculate the total thrust energy required to complete the flight in advance, the fuel storage unit 1372-1 stores the amount of fuel to generate the thrust required for flight in the cruise mode in consideration of the calculated total thrust energy, and the battery unit 1372-10 may be charged with electricity sufficient to generate thrust necessary for flight in a take-off mode and a landing mode mainly performed in the urban area.

However, when the battery unit 1372-10 needs to be additionally charged in consideration of the possibility that the UAM flight route may change due to an off-nominal situation, the electricity generated by the generator 1372-4 driven through the internal combustion engine 1372-2 that generated the thrust for the flight of the UAM aerial vehicle 152 may be charged in the battery unit 1372-10.

Each block configuration of the power providing system 1370 of FIG. 14 is described in Table 3 below.

TABLE 3

| Block configuration | Description |
|---|---|
| Fuel Tank (1372-1) | It stores the UAM aerial vehicle flight fuel. |
| Internal combustion engine (1372-2) | It generates power to drive the generator 1372-4 by combusting fuel stored in the fuel tank 1372-1. |
| Generator (1372-4) | It generates electricity with power generated by the internal combustion engine 1372-2. |
| Electric motor 1~8 | It rotates a shaft connected to fan/propeller/rotor through electricity supplied from the generator 1372-4 or the battery unit 1372-10, so the electric motor selected according to the control signal from the motor controller 1372-12 generates the thrust/lift required for the flight of the UAM aerial vehicle. |
| FAN 1~8 | It is mechanically coupled with the shafts of electric motors 1 to 8, respectively, and generates thrust/lift as the shaft rotates. |
| Motor control unit (1372-12) | It measures the status (current, voltage) of each electric motor to determine normal operation/fail occurrence and generates the RPM control signal to control the RPM of each electric motor. |
| Power supply path control unit (1372-6) | It generates a path selection signal for selecting a path (first power supply path 1302 or second power supply path 1304) to supply operating power to the electric motors 1 to 8, and controls the generator 1372-4 or the BMS 1372-8 to supply power through the path selected according to the path selection signal. |
| Propulsion control signal bus (1360) | It sets the power supply path 1302 or 1304 to supply the operating power to the electric motors 1 to 8 according to the path selection signal. |
| BMS (1372-8) | It monitors the state of charge/discharge and charging voltage of each battery cell of the battery unit 1372-10. |
| Flight Control System (1380) | It outputs the flight control surface control signal 1380a to control the roll/yaw/pitch motion of the UAM aerial vehicle by the pilot or pre-programmed autopilot program. |

According to an embodiment of the present disclosure, the flight control surface control signal 1380a may include at least one of a signal for controlling aileron, elevator, rudder, flap, etc., attached to the UAM aerial vehicle when the UAM aerial vehicle is a fixed-wing, a signal for controlling a pitch angle of the rotor of the UAM aerial vehicle when the UAM aerial vehicle is a rotary-wing, and a propulsion power control signal, which is a signal to control the thrust strength of the UAM aerial vehicle.

Figure 15:
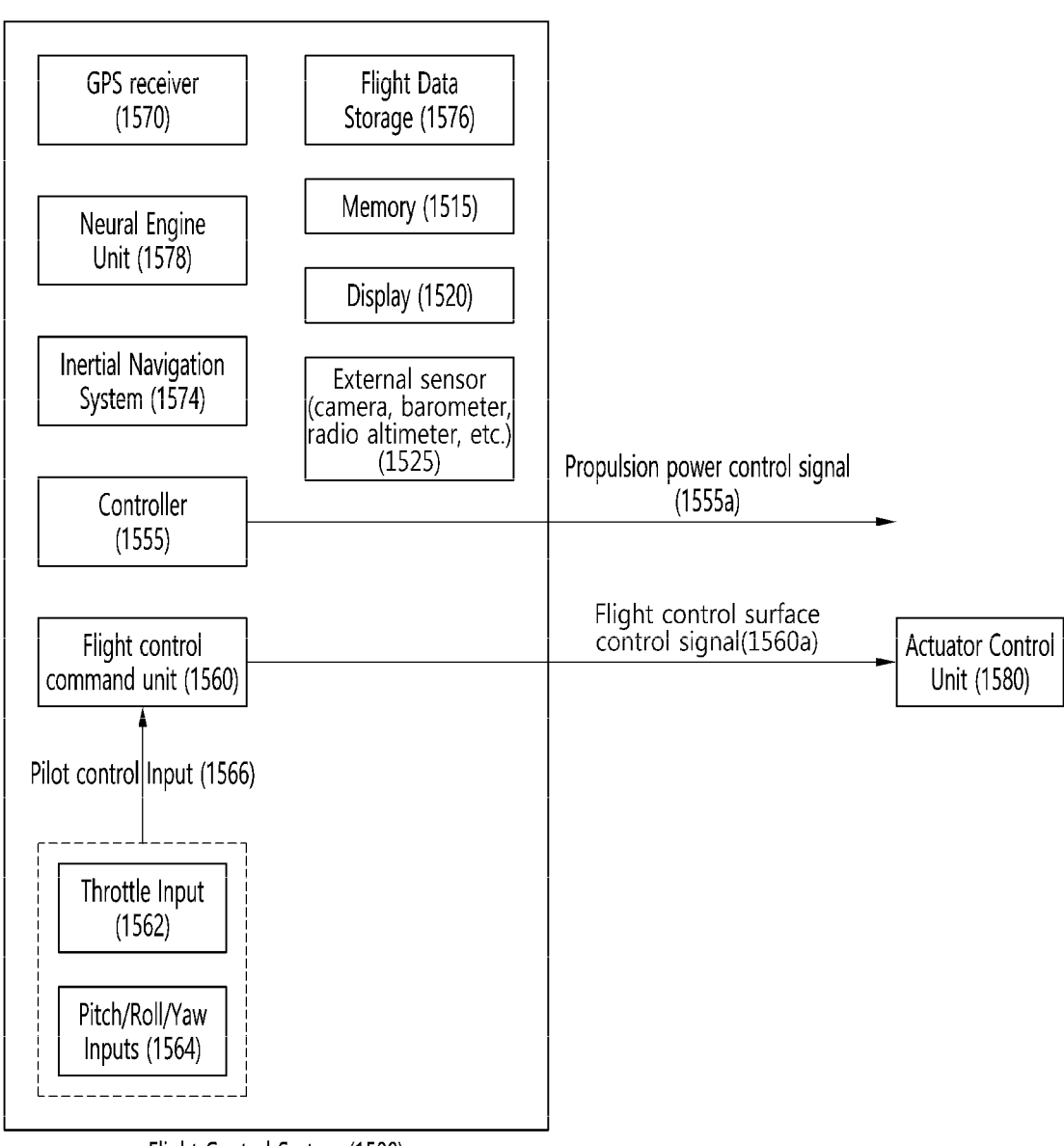

FIG. 15 is a block configuration diagram of a flight control system 1500 of the UAM aerial vehicle 152 according to another embodiment of the present disclosure.

The memory 1515 stores a navigation map on which the UAM aerial vehicle 152 will fly, mission data, flight data, and the like.

The display 1520 displays the current route of the UAM aerial vehicle 152, flight data, an operation status of each part of the UAM aerial vehicle 152, a flight status of the UAM aerial vehicle 152, and the like.

The communication unit 1535 performs wireless communication with a ground station and/or other UAM aerial vehicle. A GPS receiver 1570 receives GPS signals from GPS satellites so that a controller 1555 may locate the UAM aerial vehicle.

The flight data storage unit 1576 stores flight data (UAM location information, altitude information, speed information, flight control surface control signal information, propulsion control signal information) of the UAM aerial vehicle 152.

A neural engine unit 1578 determines the failure or the possibility of failure of each part of the UAM through pre-trained data, and the inertial navigation system 1574 provides inertial navigation data to assist the inertial navigation of the UAM aerial vehicle.

The controller 1555 outputs a thrust control signal 1555a for controlling the thrust strength of each propulsion unit to the propulsion system 1350. The controller 1555 calculates the required thrust according to the flight mode or flight area of the UAM aerial vehicle 152, selects a propulsion unit that will generate the calculated thrust, or outputs a propulsion unit selection signal for selecting a propulsion unit to replace the failed propulsion unit among normal units to the propulsion system 1350 when a fail occurs in the selected propulsion unit.

A flight control command unit 1560 outputs the flight control surface control signal 1560a of the UAM aerial vehicle generated by the auto pilot program of the pilot/UAM aerial vehicle 152 to an actuator control unit 1580, and controls actuators for controlling the flight of the UAM aerial vehicle 152.

FIG. 15 illustrates that a pilot control input 1566 including a throttle input 1562 and pitch/roll/yaw inputs 1564 is input to the flight control command unit 1560 by a pilot who controls the UAM aerial vehicle 152, but when the UAM aerial vehicle 152 operates in an autopilot mode, various parameters for flying along the pre-planned flight route may be input to the flight control command unit 1560.

In addition, the external sensor 1525 is a sensor that acquires information on the external environment of the UAM aerial vehicle 152, such as a camera, a barometer, a radio altimeter, a radar, and a Lidar, and information for grasping the status, and the internal sensor 1530 is a sensor that acquires information on the weight, internal temperature, and internal air pressure of the UAM aerial vehicle.

Figure 16:
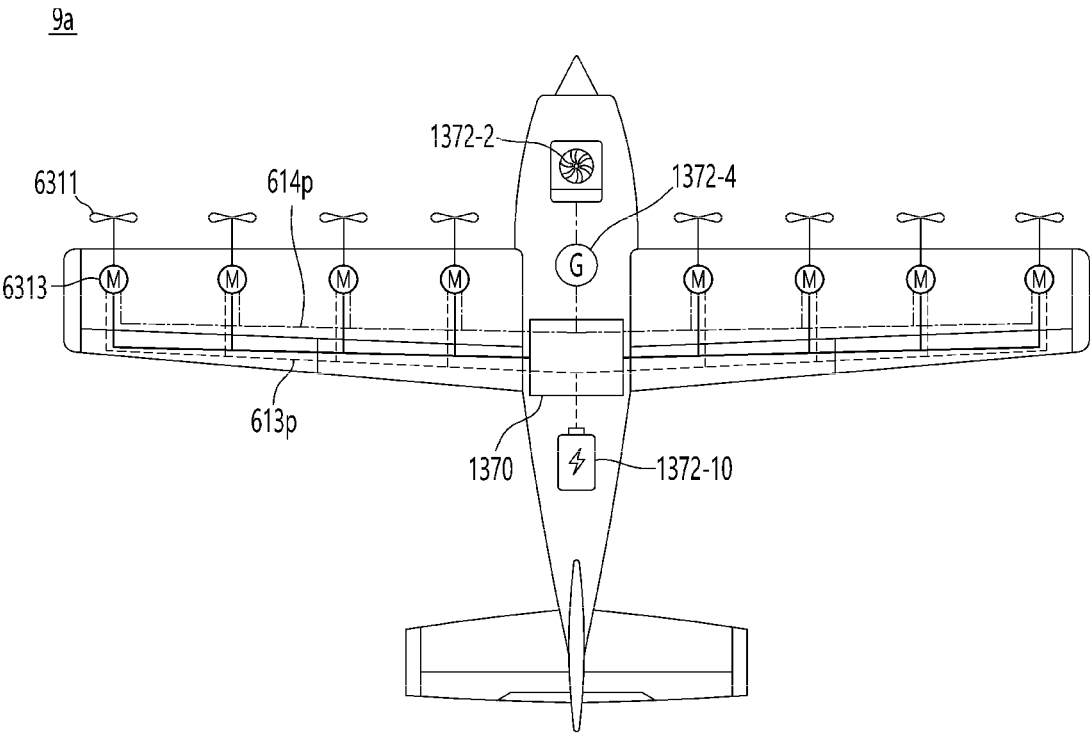
FIGS. 16 and 17 are diagrams illustrating the aerial vehicle using a hybrid distributed propulsion system according to an exemplary embodiment of the present disclosure.
Figure 17:
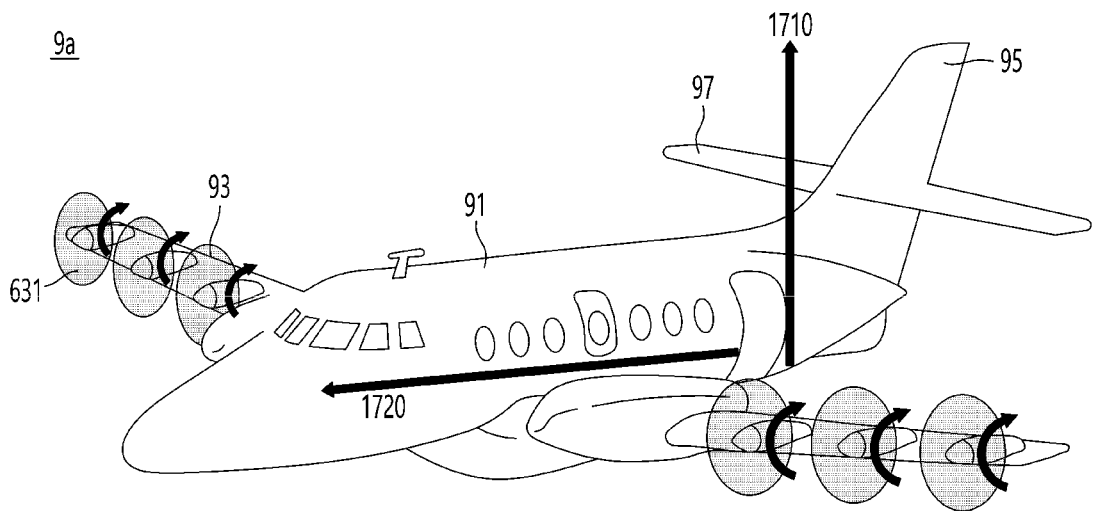

FIGS. 16 and 17 are diagrams illustrating an aerial vehicle using a hybrid distributed propulsion system according to an embodiment of the present disclosure.

An aerial vehicle 9a of the present embodiment may include an internal combustion engine 1372-2, a generator 1372-4, a battery unit 1372-10, and a power providing system 1370. Hereinafter, a description for contents overlapped with the contents described above will be omitted.

The aerial vehicle 9a of the present embodiment may include a body 91, a wing 93, a rudder 95, and an elevator 97, and the wing 93 may include an aileron. It is possible to control the attitude of the aerial vehicle 9a through the aileron, the rudder 95, and the elevator 97.

In addition, the propulsion units 631 of the present embodiment may include a motor 6313 and a fan 6311 and may be rotatably provided. For example, when the propulsion unit 631 performs the increase in the vertical altitude of the aerial vehicle 9a, the plane formed by the wing 93 and the rotational plane of the fan 6311 may be located in parallel (hereinafter referred to as "first direction") (1710), and when the propulsion unit 631 performs forward flight of the aerial vehicle 9a, the rotational axis of the fan 6311 may be located parallel to the flight direction of the aerial vehicle 9a (hereinafter referred to as "second direction") (1720).

In an embodiment of the present disclosure, it is also possible to change the thrust direction of the propulsion unit by tilting the propulsion unit under the control of the power providing system 1370.

Meanwhile, as described above, the power supply path control unit 1372-6 may select at least one of the generator 613 and the battery unit 614 to supply power necessary for the operation of the propulsion unit 631.

Therefore, in the UAM aerial vehicle 9a according to the embodiment of the present disclosure, a power supply path 614p connecting the generator 1372-4 and the propulsion unit 631 and a power supply path 613p connecting the battery unit 1372-10 and the propulsion unit 631 may be disposed separately from each other.

Figure 18:
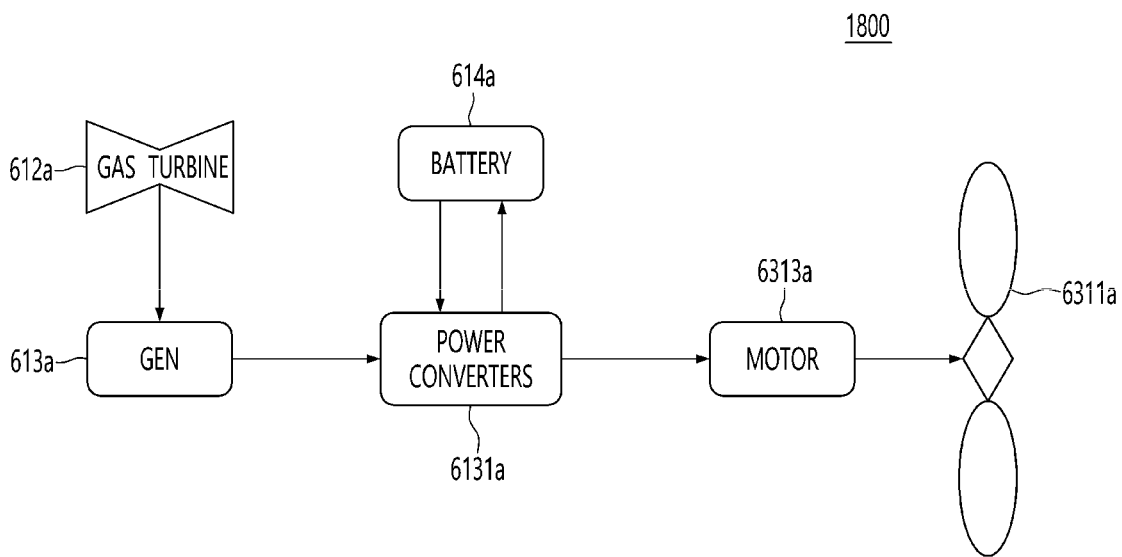
FIG. 18 is a diagram illustrating a serial hybrid propulsion system.
Figure 19:
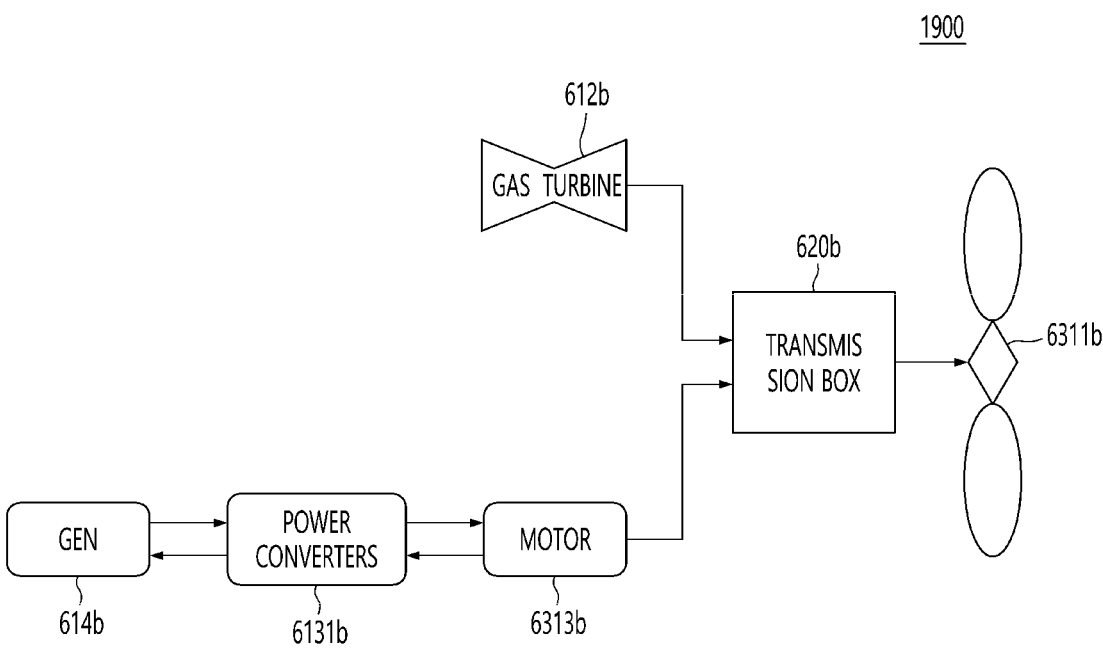
FIG. 19 is a diagram illustrating a parallel hybrid propulsion system.
Figure 20:
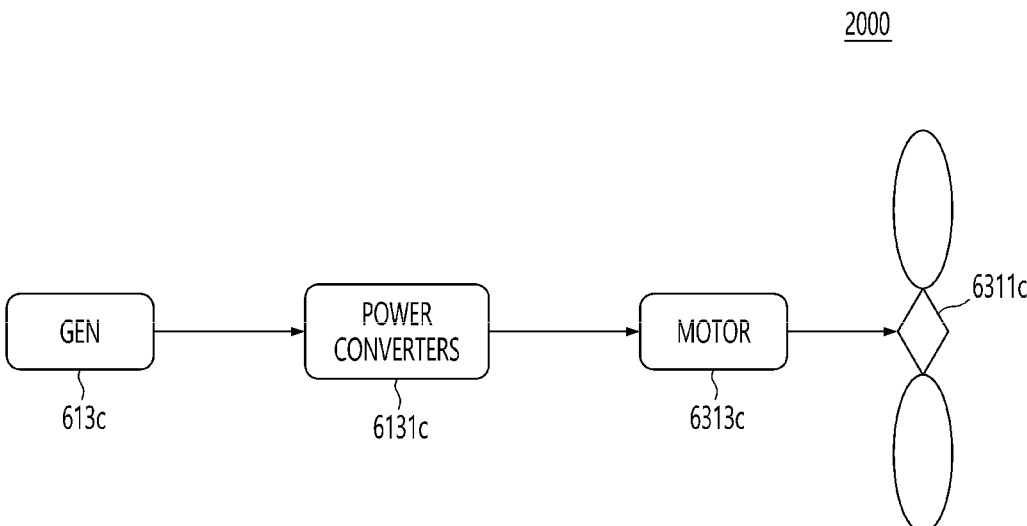
FIG. 20 is a diagram illustrating a propulsion system of an electric propulsion method.

FIGS. 18 to 20 are diagrams illustrating the structure of the hybrid distributed propulsion system according to the exemplary embodiment of the present disclosure.

FIG. 18 is a diagram illustrating a serial hybrid propulsion system 1800, FIG. 19 is a diagram illustrating a parallel hybrid propulsion system 1900, and FIG. 20 is a diagram illustrating a propulsion system 2000 of an electric propulsion method. In FIGS. 18 to 20, the internal combustion engine 612a uses a gas turbine method, but this is only one method of the internal combustion engine, and the present disclosure is not limited thereto.

Referring to FIG. 18, a series hybrid propulsion system 1800 may include an internal combustion engine 612a, a power generation unit 613a, a power converter 6131a, a battery 614a, a motor 6313a, and a fan 6311a.

In the configuration of the series hybrid propulsion system 1800 illustrated in FIG. 18, the internal combustion engine 612a is not directly connected to the propulsion unit 631. The fan 6311a may only be driven by an electric motor 6313a. The series hybrid propulsion system 1800 is similar to turboelectric architecture except that a battery 614a stores energy and contributes to propulsion.

Then, the generator 613a converts mechanical energy of the internal combustion engine 612a into electrical energy. In addition, the electric energy generated by the generator 613a may directly drive the motor 6313a or charge the battery 614a.

In the case of the serial hybrid propulsion system 1800 illustrated in FIG. 18, since there is no direct connection between the fan 6311a and the internal combustion engine 612a, the internal combustion engine 612a may operate under optimal conditions at all stages of flight, thereby reducing the fuel consumption compared to the parallel hybrid propulsion system 1900. In addition, the serial hybrid propulsion system 1800 is easy to configure, so that it may exhibit higher usefulness when the internal combustion engine 612a is arranged, and thus, the space efficiency of the aerial vehicle may be increased.

However, in the case of the serial hybrid propulsion system 1800, since the generator 613a is additionally required in addition to the battery 614a, an empty weight of the aerial vehicle may be heavier compared to the parallel hybrid propulsion system 1900 of FIG. 19, and since the output of the generator 613a is converted through the power converter 6131a before supplying power to the motor 6313a, more power loss may occur than the parallel hybrid propulsion.

Meanwhile, referring to FIG. 19, a parallel hybrid propulsion system 1900 according to an embodiment of the present disclosure may include an internal combustion engine 612b, a power converter 6131b, a battery 614b, a motor 6313b, a transmission 620b, and a fan 6311b.

In the parallel hybrid propulsion system 1900 illustrated in FIG. 19, the internal combustion engine 612b and the electric motor 6313b are connected to the fan 6311b through a mechanical coupling 620b, so both powertrains may either simultaneously or individually contribute to generating the thrust of the aerial vehicle.

However, the parallel hybrid propulsion system 1900 is structurally more complex and consumes more fuel than the serial hybrid system 1800, as described above. Nevertheless, since the parallel hybrid propulsion system 1900 may reduce weight by reducing the motor 6313*b* or the internal combustion engine 612*b* compared to the serial hybrid propulsion system 1800, it is possible to generate the same thrust while reducing the empty load of the aerial vehicle compared to the serial hybrid propulsion system 1800.

In addition, when the aerial vehicle acquires the thrust using only the internal combustion engine 612*b*, since the motor 6313*b* is configured in parallel with the internal combustion engine 612*b*, the parallel hybrid propulsion system 1900 may charge the battery 614*b* through the driving of the motor 6313*b*.

In addition, since the parallel hybrid propulsion system 1900 does not require the power converter in the internal combustion engine 612*b* unlike the serial hybrid propulsion system 1800, it is possible to reduce power dissipation due to the energy conversion.

Meanwhile, referring to FIG. 20, the electric propulsion system 2000 may include a generator 613*c*, a power converter 6131*c*, a motor 6313*c*, and a fan 6311*c*. The electric propulsion system has a simpler architecture than the series hybrid propulsion system 1800 and the parallel hybrid propulsion system 1900 described above, and the power in the electric propulsion system 2000 may be supplied through a rechargeable battery connected to the motor 6313*c*.

Therefore, in the case of the electric propulsion system 2000, it is difficult to charge the battery while the aerial vehicle is operating, and the battery should be charged on the ground before the aerial vehicle performs its mission.

Figure 21:
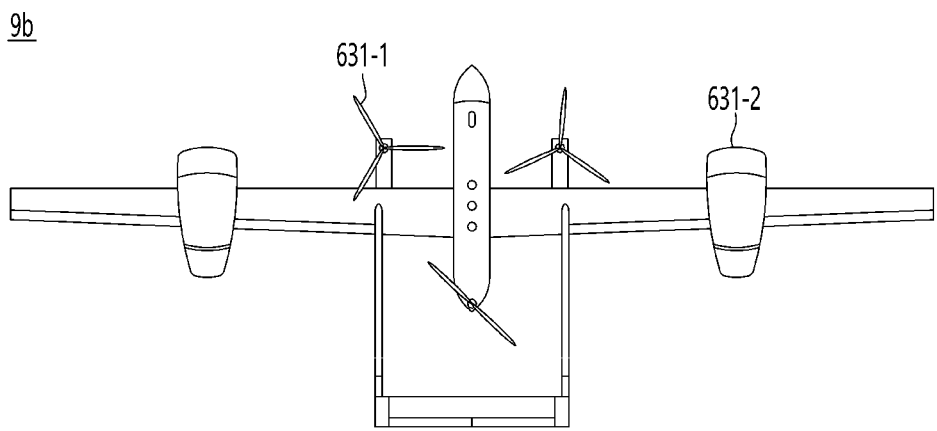
FIGS. 21 and 22 are diagrams illustrating a display and the aerial vehicle using a hybrid distributed propulsion system according to an exemplary embodiment of the present disclosure.
Figure 22:
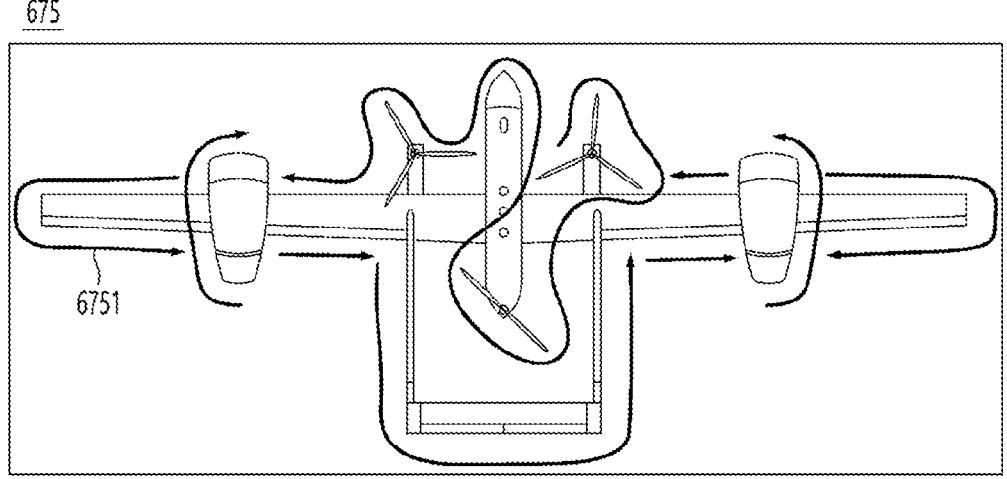

FIGS. 21 and 22 are diagrams illustrating a display and the aerial vehicle using a hybrid distributed propulsion system according to the exemplary embodiment of the present disclosure.

Referring to FIG. 21, in an aerial vehicle 9*b* according to an exemplary embodiment of the present disclosure, a propulsion unit 631-1 for take-off and landing and a propulsion unit 631-2 for forward flight, cruise, etc., may be provided independently.

In this configuration, the propulsion unit 631-1 for take-off and landing may receive power through the battery unit, and the propulsion unit 631-2 for the forward flight, the cruise, etc., may receive the power generated by the internal combustion engine.

Meanwhile, referring to FIG. 22, the display unit 675 may display the appearance of the exemplary aerial vehicle 9*b* illustrated in FIG. 21. In addition, the inspection unit 679 may display an order 6751 for inspecting the configuration of the aerial vehicle 9*b* on the display unit 675. This will be described along with a method of controlling an aerial vehicle according to the exemplary embodiment of the present disclosure through the drawings to be described later.

Figure 23:
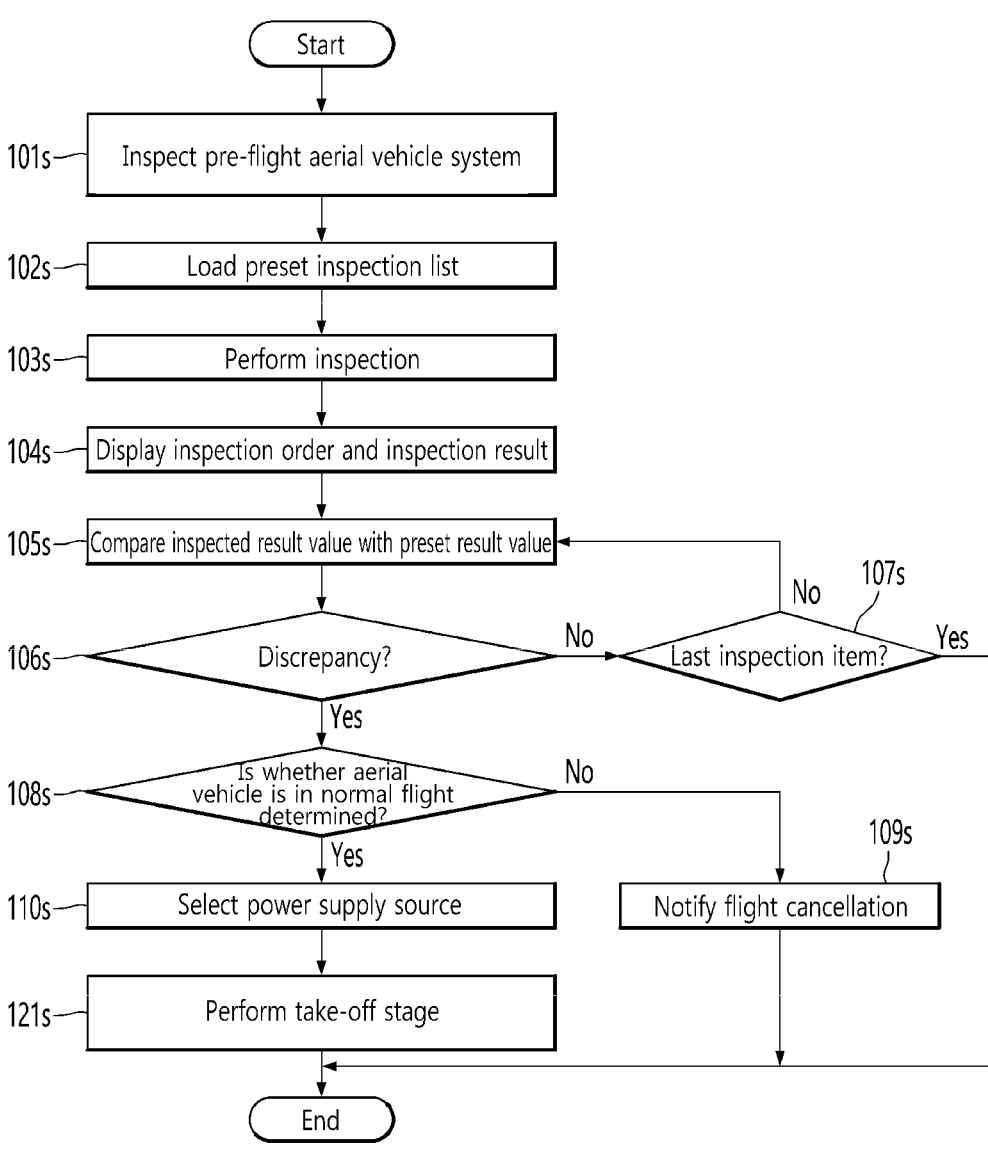
FIGS. 23 to 25 are diagrams illustrating a method of controlling an aerial vehicle using a hybrid distributed propulsion system according to an exemplary embodiment of the present disclosure.
Figure 24:
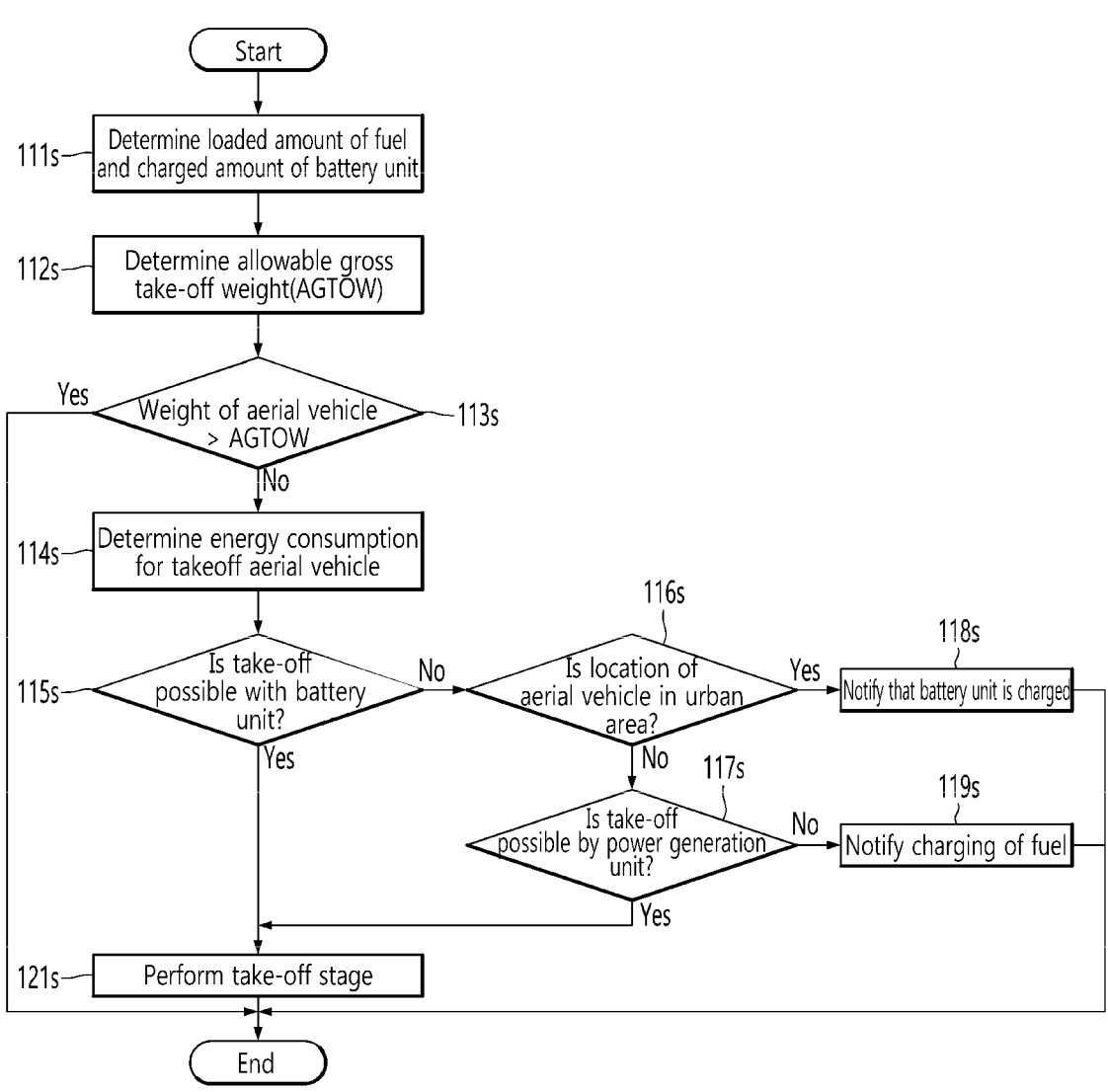
Figure 25:
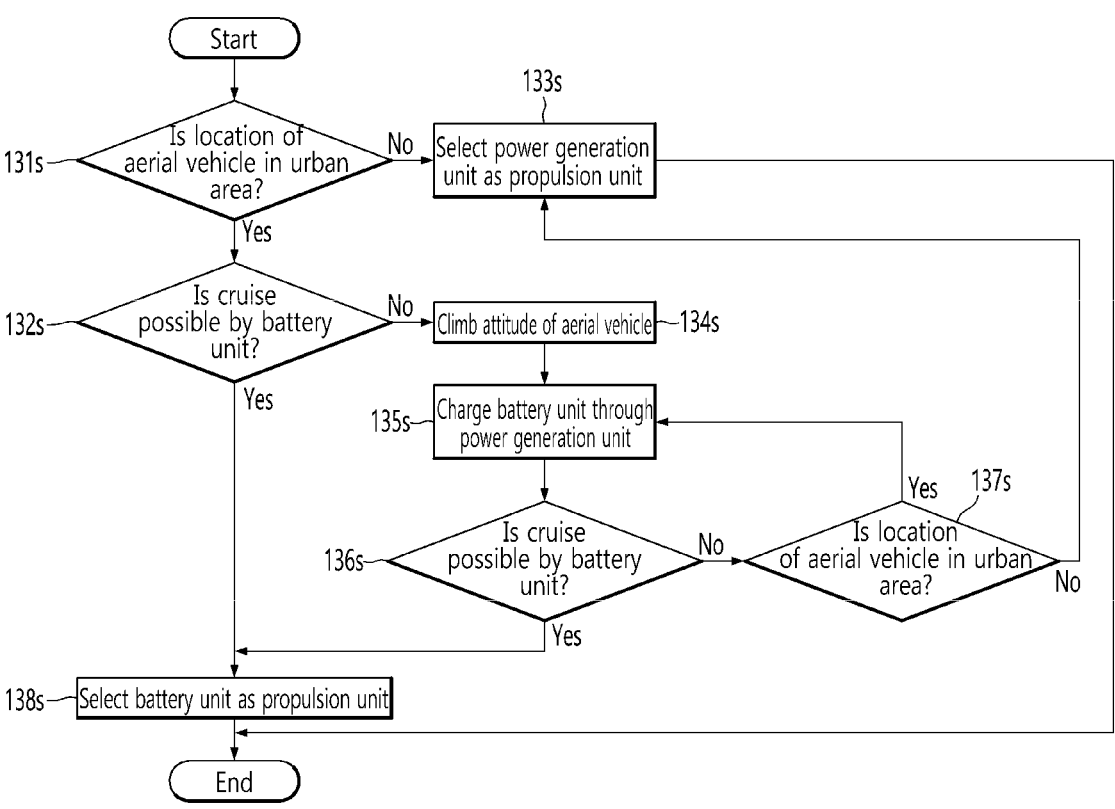

FIGS. 23 to 25 are diagrams illustrating a method of controlling an aerial vehicle using a hybrid distributed propulsion system according to an exemplary embodiment of the present disclosure.

It will be described with reference to FIGS. 23 to 25 below.

Referring to FIG. 23, in the method of controlling an aerial vehicle using a hybrid distributed propulsion system according to an exemplary embodiment of the present disclosure, a step in which a processing unit 670 inspects a system of a pre-flight aerial vehicle through an inspection unit 679 (101*s*) may start as a first step.

In the inspection of the system (101*s*), after the preset inspection list stored in the flight information storage unit 1576 or the memory 1515 is loaded (102*s*), it is possible to sequentially perform the inspection (103*s*) while matching the components of the power providing system 1370, the control surface, etc., with the normal data of the loaded inspection list.

The display unit 675 may display the process or result of performing the inspection of the aerial vehicle through the inspection unit 679 (104*s*). In addition, the inspection unit 679 may perform a comparison between system inspection result data of the aerial vehicle and the preset result data (105*s*). The above-described steps 101*s* to 104*s* may be performed sequentially or simultaneously.

In addition, the inspection unit 679 may determine whether there is a discrepancy between the system inspection result data of the aerial vehicle and the preset result data in the comparison step 105*s* (106*s*).

When there is a discrepancy between the aerial vehicle system inspection result and the predetermined result (106*s*: YES), the inspection unit 679 may determine whether the normal flight of the aerial vehicle is possible (108*s*).

However, if there is no discrepancy between the flight vehicle system inspection result data and the preset result data in the above step (106*s*) (106*s*: NO), the confirmation step (107*s*) of determining whether it is the last inspection item of the aerial vehicle system based on the preset result data may be performed, and when it is not the last inspection item (107*s*: NO), the above-described comparison step (105*s*) may be performed.

In the confirmation step (107*s*), when it is the last inspection item among the aerial vehicle systems (107*s*: YES), it may be determined that it corresponds to the case where the aerial vehicle may normally perform the mission according to the preset flight plan.

On the other hand, when the normal flight of the aerial vehicle is possible in the above step (108*s*) (108*s*: YES), the first power supply source selection step (110*s*) of any one of the generator 1372-4 generating power by consuming fuel through the power supply path control unit 651 and the battery unit 1372-10 charged by receiving power from the generator 1372-4 or power from the outside may be performed.

In addition, the aerial vehicle may perform a take-off step (121*s*) based on the power selected in the first power source selection step (110*s*).

However, when the normal flight of the aerial vehicle is impossible in the above step (108*s*) (108*s*: NO), the flight cancellation notification (109*s*) of the aerial vehicle may be generated, and the generated notification (109*s*) may be expressed in various ways inside the aerial vehicle.

Meanwhile, the above-described steps 106*s*, 107*s*, and 108*s* may be performed through the neural engine unit 672, and illustratively, supervised learning is performed based on accumulated information of the preset inspection result data to determine the correlation between the failure of each component of the aerial vehicle, the possibility of failure, and whether the normal flight of the vehicle is possible.

Referring to FIG. 24, the first power supply source selection step 110*s* may include a thrust determination step of determining the thrust necessary for the mission of the aerial vehicle or a step of generating a fuel charging notification (111*s* to 119*s*).

In the thrust determining step 111*s*, the loaded amount of fuel to be stored in the fuel storage unit 611 and the charged amount of the battery unit 614 may be determined based on the thrust required for the mission of the aerial vehicle.

In addition, the power control unit 65 or the flight control system 67 may determine the allowable gross takeoff weight (AGTOW) of the aerial vehicle through the loaded amount of fuel and the charge amount of the battery unit determined based on the thrust necessary for the mission of the aerial vehicle in the thrust determination step (111s).

The allowable gross takeoff weight means the weight of the aerial vehicle applied to safely take off and land, and is determined as the smallest weight among the following four weights.

The above four weights may refer to a maximum take-off weight at which a landing gear and seams are not damaged without fuel being released when an emergency landing is required due to a problem with the airframe immediately after take-off, a restricted take-off weight considering the take-off environment, performance, etc., of the aerial vehicle, a maximum zero fuel weight+T/O fuel set by the strength of the wing structure of the aerial vehicle when it is assumed that there is no fuel, and a maximum landing weight+trip fuel at which the landing gear and seams are not damaged without fuel being released when touching the ground at a specified speed, and as described above, the allowable gross takeoff weight (AGTOW) may be determined as the smallest weight among the four weights.

On the other hand, since the aerial vehicle of the present embodiment determines the loaded amount of fuel stored in the fuel storage unit 611 and the charged amount of the battery unit 614 based on the thrust determining step 111s, the allowable gross takeoff weight (AGTOW) of the aerial vehicle may be determined based on the thrust determining step 111s.

In addition, the flight control system 67 may compare the weight of the aerial vehicle with the determined allowable gross takeoff weight (AGTOW) (113s), and determine the energy consumption for takeoff of the aerial vehicle when the weight of the aerial vehicle is less than the determined allowable gross takeoff weight (AGTOW) (113s: NO).

However, when the weight of the aerial vehicle is greater than the determined allowable gross takeoff weight (AG-TOW) (113: YES), it corresponds to the case where the flight mission may not be performed, so the system may be terminated without performing the take-off stage.

The above-described determination of the allowable gross takeoff weight (AGTOW) of the aerial vehicle (112s) and the comparison of the weight of the aerial vehicle and the allowable gross takeoff weight (AGTOW) (113s) may be determined or made by allowing the PSU 102, the UAM operator 154, the ATM operator 254, and the like to receive the status information of the aerial vehicle transmitted from the UAM aerial vehicle 152.

The energy consumption including the required fuel and battery consumption necessary for the aerial vehicle to perform its mission may be determined (114s), and the flight control system 67 may determine whether the take-off is possible by the battery unit 1372-10 (115s).

When the take-off is possible by the battery unit 1372-10 (115s: YES), the flight control system 67 supplies power to the propulsion unit 63 through the power control unit 65 and the battery unit 1372-10, thereby performing the take-off step of the aerial vehicle (121s).

Meanwhile, when the take-off is impossible by the battery unit 1372-10 (115s: NO), the flight control system 67 may determine whether the location of the aerial vehicle is the urban area through the inertial navigation system 673 (116s) to generate the battery unit charging notification (118s) when the aerial vehicle is located in the urban area (116s: YES).

However, when the aerial vehicle is located in the suburban area outside the urban area (116s: NO), the flight control system 67 may determine whether the take-off is possible through the generator 1372-4 (117s).

In the step (117s), when the aerial vehicle may take off through the generator 1372-4 (117s: YES), the flight control system 67 may perform the take-off step of the aerial vehicle (121s).

However, in the step (117s), when it is impossible to take off the aerial vehicle through the generator 1372-4 (117s: NO), the fuel charging notification (119s) may be generated.

That is, as described above, the aerial vehicle of the present embodiment is a means of urban traffic air transportation, and in order to reduce noise and pollution in the urban area, the thrust may be generated by supplying power to the plurality of propulsion units 1302 to 1316 through the battery unit 1372-10 during the take-off or landing.

However, when the aerial vehicle is unable to take off by the battery unit 1372-10, the take-off may be performed through the generator 1372-4 only when the aerial vehicle is located in the suburban area outside the urban area based on the location of the aerial vehicle.

In addition, when the aerial vehicle may not take off by the battery unit 1372-10 and is located in the urban area, the charging notification of the battery unit 1372-10 may be generated (118s) to induce preferential selection of an electric-based thrust system to reduce noise and pollution in the urban area.

Meanwhile, referring to FIG. 25, a method of controlling an aerial vehicle in a post-take-off stage (cruise stage, descending stage, landing stage, etc.) will be described. Some and/or all of the steps illustrated in FIG. 24 may be included in the first power source selection step 110s of selecting a power source in the take-off stage, and some or all of the steps illustrated in FIG. 25 may be included in the second power source selection step (130s) of selecting a power supply source in the post-take-off stage.

The method of controlling an aerial vehicle (selection of the second power source) of the present embodiment may include a second determination step (131s) of determining whether the location of the aerial vehicle is the urban area through the inertial navigation system 673 after the aerial vehicle take-off step 121s is performed.

The flight stage in which the second determination step 131s is performed may include any one of an ascending stage 511, a cruise stage 513, a descending stage 515, and a landing stage.

In the second determination step (131s), when the location of the aerial vehicle corresponds to the suburban area outside the city (131s: NO), the flight control system 67 may select the generator 1372-4 as the propulsion unit (133s) to perform the flight mission.

Meanwhile, in the second determination step 131s, when the location of the aerial vehicle corresponds to the urban area (131s: YES), the flight control system 67 may determine whether to increase the altitude of the aerial vehicle based on whether the aerial vehicle can fly through the battery unit 1372-10.

More specifically, in the second determination step 131s, when the location of the aerial vehicle corresponds to the urban area (131s: YES), the flight control system 67 may determine whether the aerial vehicle can fly through the battery unit 614 (132s).

When the aerial vehicle can fly through the battery unit 1372-10 (132s: YES), the power control unit 65 may select the battery unit 1372-10 as the power supply source (138s).

However, when the aerial vehicle is unable to fly through the battery unit 1372-10 (132*s*: NO), the aerial vehicle may increase the altitude through the flight control system 67 (134*s*).

When the altitude of the aerial vehicle increases (134*s*), the flight control system 67 may charge the battery unit 1372-10 through the generator 1372-4 (135*s*).

In addition, the flight control system 67 may determine whether the flight is possible by the battery unit 1372-10 (136*s*).

When the aerial vehicle can fly through the battery unit 1372-10 (136*s*: YES), the power control unit 67 may select the battery unit 1372-10 as the power supply source (138*s*).

However, when the aerial vehicle cannot cruise by the battery unit 1372-10 (136*s*: NO), the flight control system 67 may determine whether the location of the aerial vehicle is located in the urban area through the inertial navigation system 673 or the GPS receiver 671.

When the location of the aerial vehicle is located in the urban area (137*s*: YES), the flight control system 67 may charge the battery unit 1372-10 through the generator 1372-4 (135*s*).

However, when the location of the aerial vehicle is not located in the urban area (137*s*: NO), the flight control system 67 may select the generator 1372-4 as the propulsion power source (133*s*).

Meanwhile, the aerial vehicle of the present embodiment may supply power to at least one propulsion unit among the plurality of propulsion units 1302 to 1316 by the battery unit 1372-10 through the power providing system 1370 in the take-off stage or landing stage.

In addition, the aerial vehicle of the present embodiment may supply power to at least one of the plurality of propulsion units 1302 to 1316 by the generator 1372-4 through the power providing system 1370 in the cruise stage.

In addition, when the location on the flight route of the aerial vehicle measured by the inertial navigation system 673 or the GPS receiver 671 in any one of the take-off stage, the ascending stage, the descending stage, and the landing stage is the urban area, the aerial vehicle of the present embodiment may supply power to at least one of the plurality of propulsion units 1302 to 1316 by the battery unit 1372-10 through the power providing system 1370.

In addition, when the location on the flight route of the aerial vehicle measured by the inertial navigation system 673 or the GPS receiver 671 in the cruise stage is the urban area, the aerial vehicle of the present embodiment may supply power to at least one of the plurality of propulsion units 1302 to 1316 by the battery unit 1372-10 through the power providing system 1370.

In addition, when the location on the flight route of the aerial vehicle measured by the inertial navigation system 673 or the GPS receiver 671 deviates from the urban area, the aerial vehicle of the present embodiment may supply power to at least one of the plurality of propulsion units 1302 to 1316 by the battery unit 1372-4 through the power providing system 1370.

That is, as described above, the power providing system 1370 may select any one of the battery unit 1372-10 or the generator 1372-4 as the power supply source in consideration of the flight stage of the aerial vehicle, such as the take-off stage, the ascending stage 511, the cruise stage 513, the descending stage 515, and the landing stage.

In addition, when the location of the aerial vehicle is the urban area in consideration of the location of the aerial vehicle together with the above-described flight stage, it is possible to operate the propulsion system through the battery unit 1372-10 as the highest priority and operate the propulsion system through the generator 1372-4 when the location of the aerial vehicle deviates from the urban area.

Figure 26:
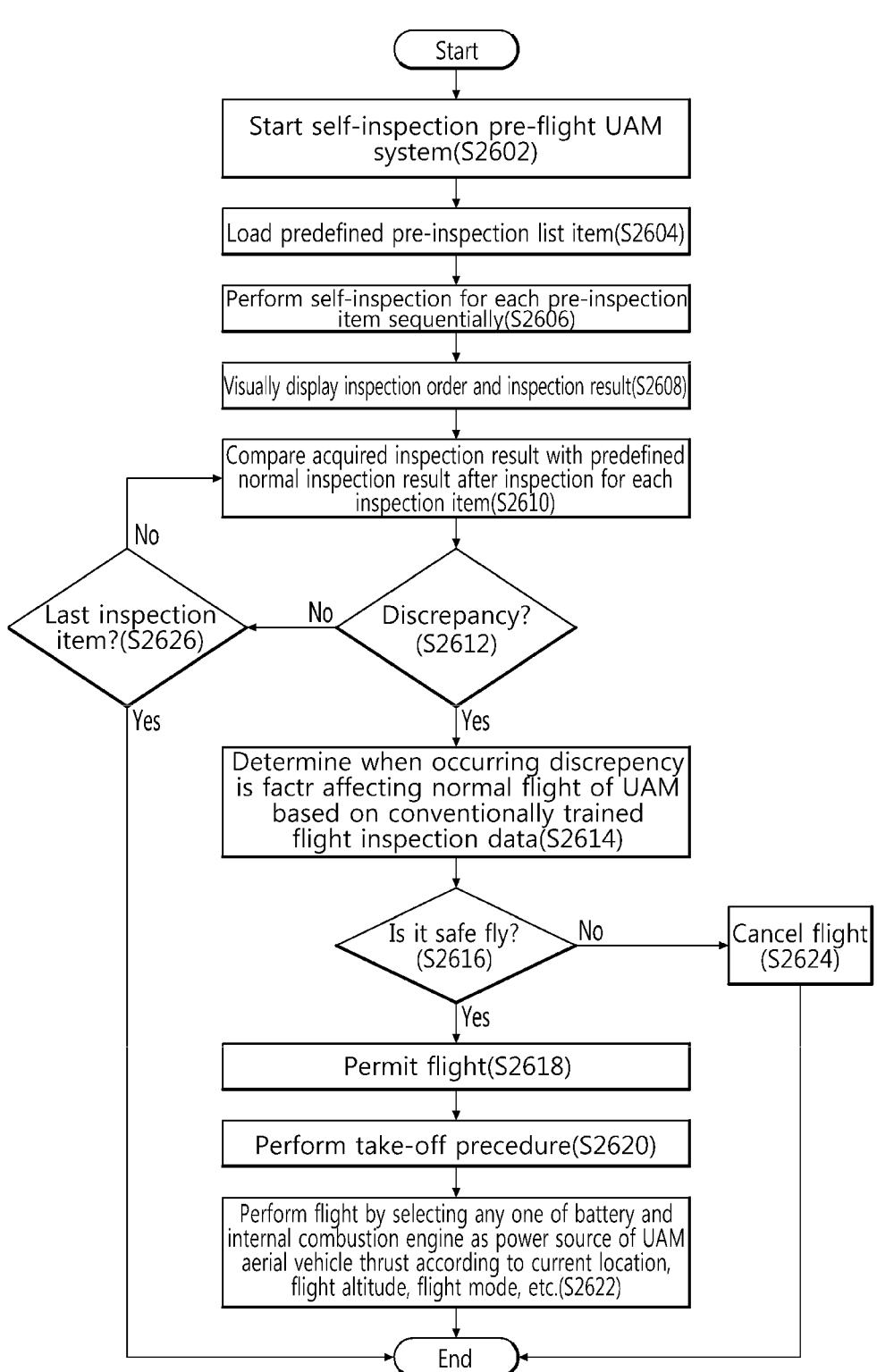
FIG. 26 is a flowchart of a flight sequence of a UAM aerial vehicle according to an embodiment of the present disclosure.

FIG. 26 is a flowchart of a flight sequence of a UAM aerial vehicle according to an embodiment of the present disclosure.

The UAM aerial vehicle 152 starts self-inspection of the pre-flight UAM system (S2602) and loads pre-defined pre-inspection list items (S2604). The UAM aerial vehicle 152 sequentially performs self-inspection for each of the loaded pre-inspection items (S2606), and visually displays the inspection sequence and inspection result (S2608).

The UAM aerial vehicle 152 compares the acquired inspection result after the sequential inspection for each inspection item with the predefined normal inspection result (S2610), and if discrepancies exist as a result of the comparison (S2612: Yes), determines whether the generated discrepancy is a factor that will affect the normal flight of the UAM based on the pre-trained flight inspection data (S2614). On the other hand, when there is no discrepancy in step S2612 (S2612: No), the UAM aerial vehicle 152 confirms whether it is the last inspection item, and when it is not the last inspection item (S2626: No), it proceeds to step S2610.

Then, when it is determined that the flight is safe as a result of the determination in step S2614 (S2616: Yes), the UAM aerial vehicle 152 requests flight permission (S2618) and performs a take-off procedure (S2620). On the other hand, when the UAM aerial vehicle 152 determines that the flight is not safe as a result of the determination in step S2614 (S2616: No), the flight is canceled (S2624).

The take-off procedure of the UAM aerial vehicle 152 in step S2620 will be described in detail with reference to FIG. 27.

When the UAM aerial vehicle 152 completes the take-off procedure in step S2620, the UAM aerial vehicle selects any one of a battery unit or an internal combustion engine as a power source for thrust according to at least one of the current location, flight altitude, and flight mode and performs flight (S2622).

The step S2622 will be described with reference to FIG. 28 to be described later.

Figure 27:
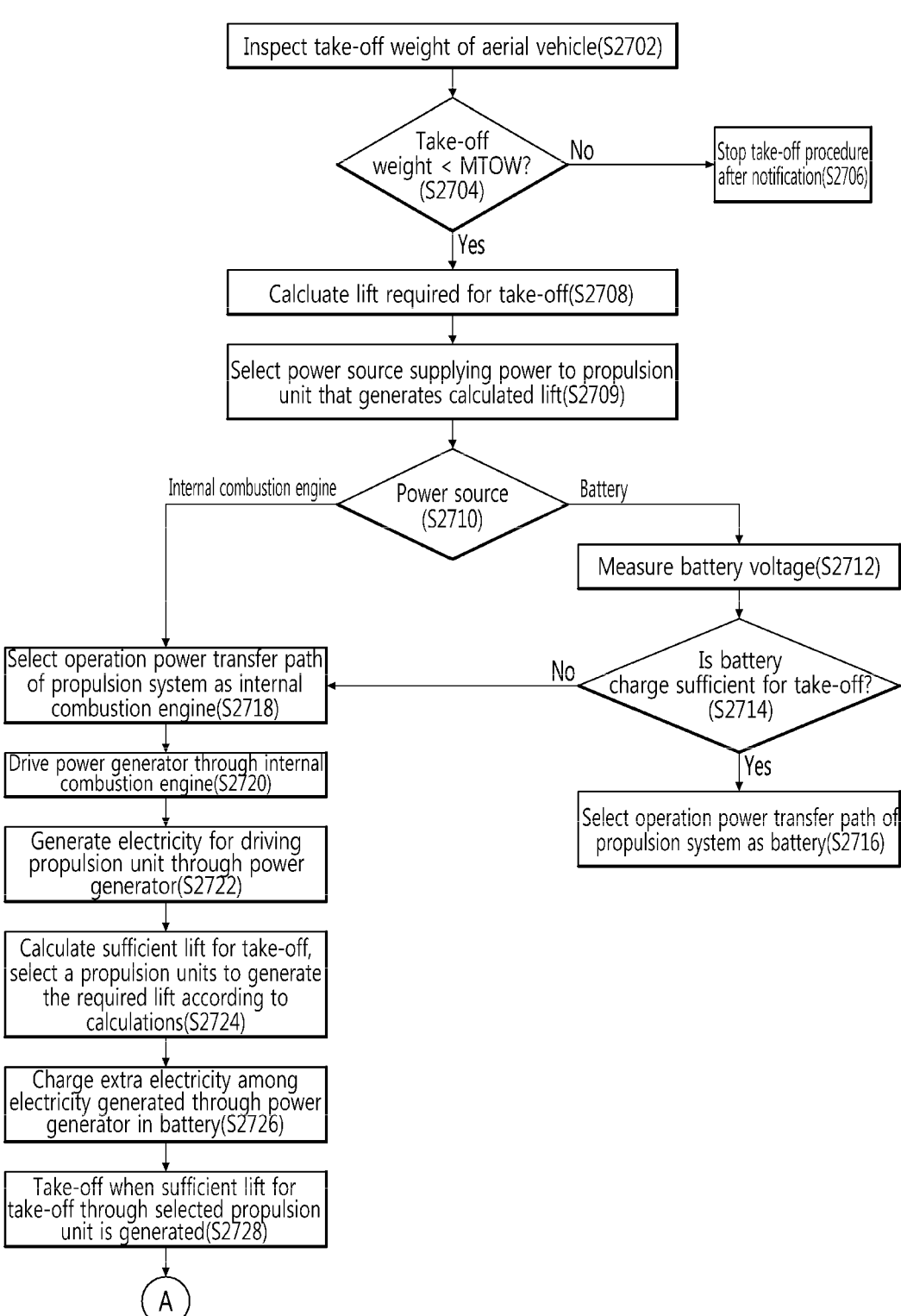
FIGS. 27 and 28 are flowcharts of a take-off procedure and a flight procedure of a UAM aerial vehicle according to an embodiment of the present disclosure.
Figure 28:
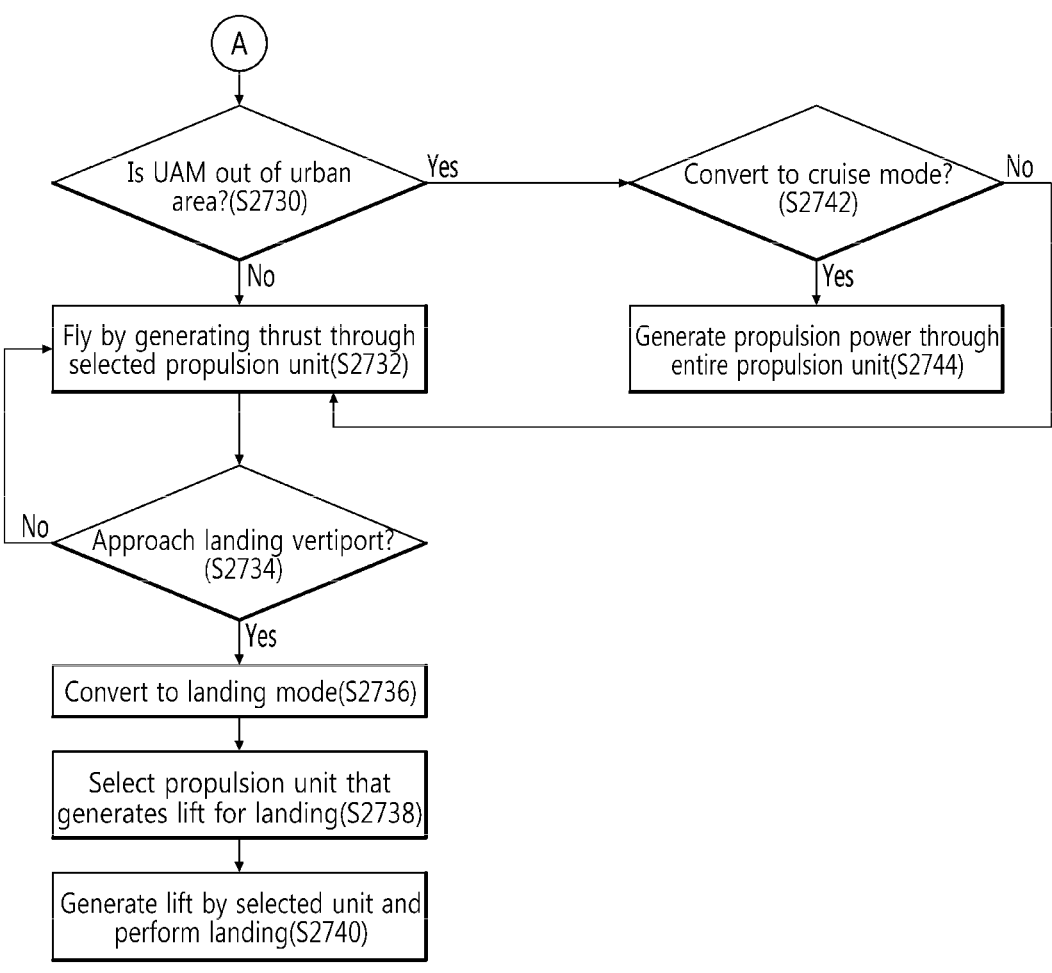

FIGS. 27 and 28 are flowcharts of a take-off procedure and a flight procedure of a UAM aerial vehicle according to an embodiment of the present disclosure.

The UAM aerial vehicle 152 checks the take-off weight of the aerial vehicle (S2702), and when the take-off weight is less than the maximum take-off weight (MTOW) (S2704: Yes), calculates the lift required for the take-off (S2708), and when the take-off weight is greater than MTOW (S2704: No), notifies the UAM operator 33*a*, the PSU 10, etc., of the fact that the take-off weight is exceeded and stops the take-off procedure (S2706).

The UAM aerial vehicle 152 selects a power source to supply power to the propulsion unit that will generate the lift calculated in step S2708 (S2709, S2710).

When the UAM aerial vehicle 152 selects the internal combustion engine as the power source in step S2710, the UAM aerial vehicle 152 selects the internal combustion engine as the operating power transmission path of the propulsion system (S2718) and drives the generator through the internal combustion engine (S2720). When electricity for driving the propulsion unit is generated through the generator (S2722), the UAM aerial vehicle 152 calculates enough lift for take-off and selects a propulsion unit to generate the necessary lift (S2724).

Then, the UAM aerial vehicle 152 charges the battery unit with extra electricity among electricity generated through the generator (S2726), and performs the take-off procedure when the sufficient lift is generated for take-off through the selected propulsion unit (S2728).

On the other hand, when the battery is selected as the power source in step S2710, the UAM aerial vehicle 152 measures the voltage of each battery cell in the battery unit (S2712), and confirms whether the state of charge of the battery is in a status capable of generating sufficient lift for take-off (S2714). When the state of charge of the battery is not sufficient to generate the lift required for takeoff of the UAM aerial vehicle (S2714: No), the UAM aerial vehicle selects the internal combustion engine as the operating power transmission path of the propulsion system (S2718), and if it is sufficient (S2714: Yes), the UAM aerial vehicle selects the battery as the operating power transmission path of the propulsion system (S2716).

Then, it is confirmed whether the current location of the UAM aerial vehicle 152 is out of the urban area (S2730), and when the UAM aerial vehicle 152 is out of the urban area (S2730 Yes), it is confirmed whether the flight mode has been converted to the cruise mode (S2742). When the flight mode is converted to the cruise mode in step S2742, the UAM aerial vehicle 152 generates thrust by operating all the propulsion units (S2744).

On the other hand, when the current location of the UAM aerial vehicle 152 does not deviate from the urban area (S2730: No), the UAM aerial vehicle 152 flies by generating the thrust through the selected propulsion unit (S2732), and confirms whether the UAM aerial vehicle approaches the vertiport for landing (S2734). When the UAM aerial vehicle 152 approaches the vertiport (S2734: Yes), the UAM aerial vehicle 152 is converted to the landing mode (S2736), the propulsion unit to generate lift for landing is selected (S2738), and the landing is performed while the selected propulsion unit generates the lift (S2740).

Figure 29:
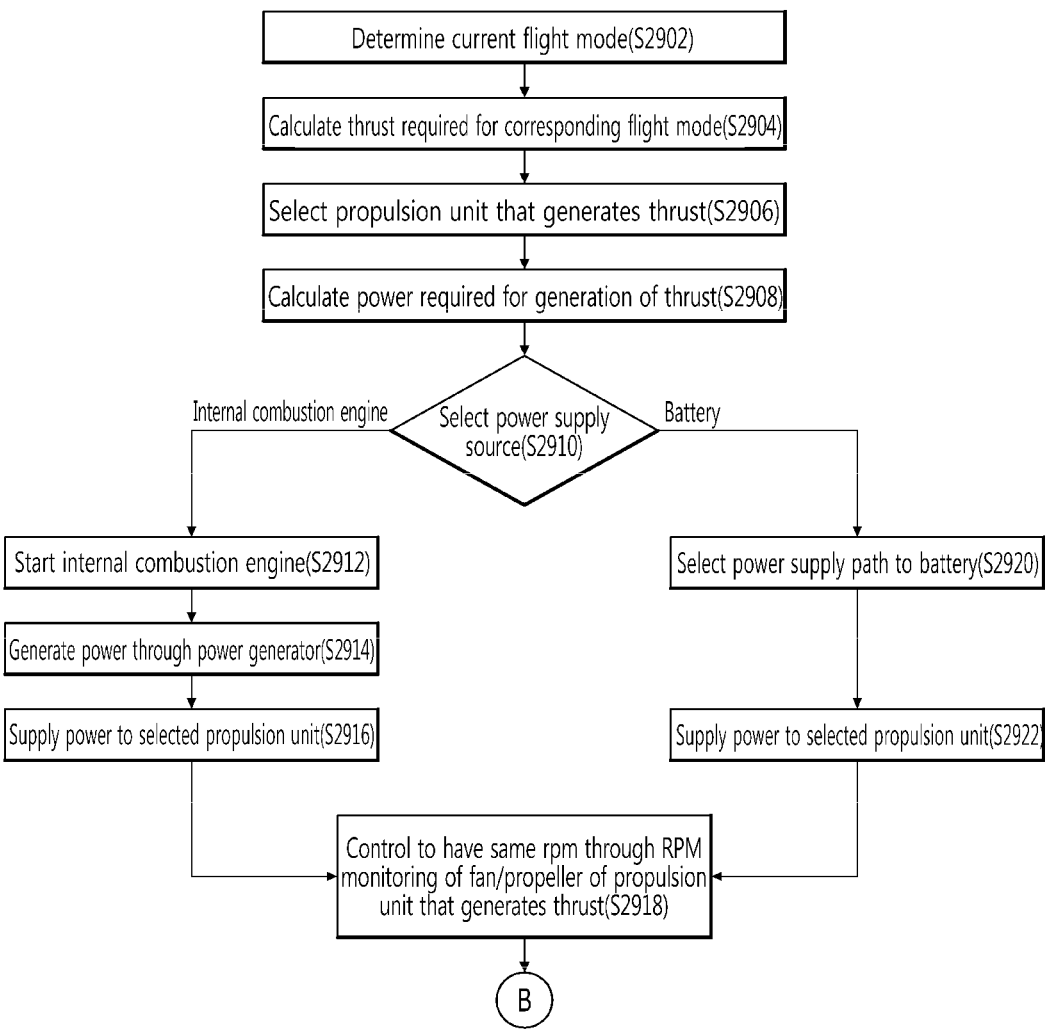
FIGS. 29 and 30 are flowcharts of thrust control procedures of the UAM aerial vehicle according to an embodiment of the present disclosure.
Figure 30:
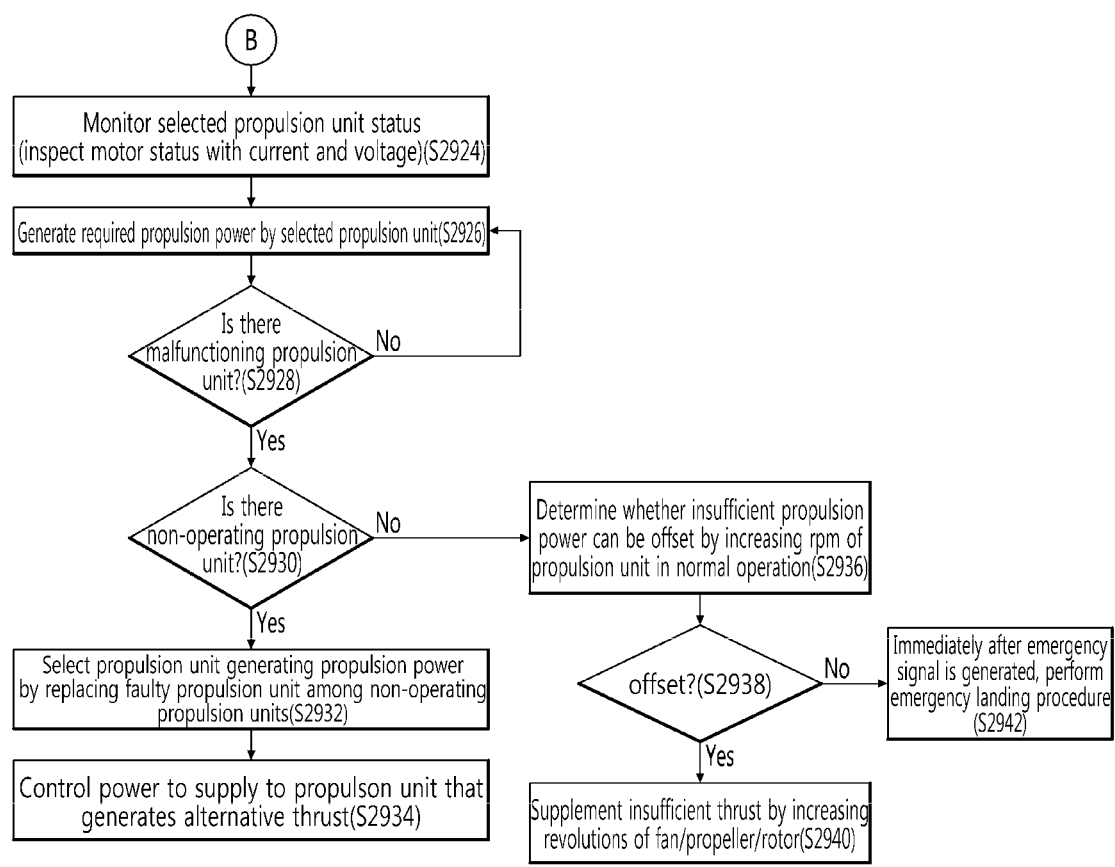

FIGS. 29 and 30 are flow charts of thrust control procedures of the UAM aerial vehicle according to the embodiment of the present disclosure.

The UAM aerial vehicle 152 determines the current flight mode (S2902), calculates the thrust required for the determined flight mode (S2904), and selects the propulsion unit to generate the thrust (S2906).

Then, the UAM aerial vehicle 152 calculates power required for the thrust generation (S2908) and selects the power supply source (S2910). The UAM aerial vehicle 152, which has selected the internal combustion engine as the power supply source in step S2910, drives the internal combustion engine using a start motor or the like (S2912). The internal combustion engine of the UAM aerial vehicle 152 generates power to drive the generator by combusting fuel supplied from a fuel tank, and the generator generates power (S2914).

The UAM aerial vehicle 152 supplies the power generated by the generator to the propulsion unit selected for the thrust generation (S2916), and controls an electric motor to maintain the same RPM through RPM monitoring of the fan/propeller/rotor or the like of the propulsion unit generating the thrust (S2918).

On the other hand, the UAM aerial vehicle 152 that has selected the battery unit as the power supply source in step S2910 selects the power supply path with the battery (S2920), and controls to supply power to the selected propulsion unit (S2922).

The UAM aerial vehicle 152 monitors the selected propulsion unit status (S2924) and (current, voltage) generates necessary propulsion force with the selected propulsion unit (S2926). Then, when there is a propulsion unit with a malfunction (S2928: Yes), the UAM aerial vehicle 152 confirms whether there is a propulsion unit that is not in operation (S2930).

When there is an inoperative propulsion unit (S2930: Yes), the UAM aerial vehicle 152 selects a propulsion unit capable of generating thrust by replacing the failed propulsion unit among the inoperative propulsion units (S2932), and controls to supply power to the propulsion unit to generate alternative thrust (S2934).

On the other hand, if there is no inoperative propulsion unit in step S2930 (S2930: No), the UAM aerial vehicle 152 determines whether insufficient thrust can be offset by increasing the RPM of the propulsion unit in normal operation (S2936).

When the offset is possible (S2938: Yes), the UAM aerial vehicle 152 increases the RPM of the fan/propeller/rotor to perform flight while compensating for the insufficient thrust (S2940), and when the offset is not possible (S2938: No), the UAM aerial vehicle 152 immediately transmits an emergency signal, and then performs an emergency landing procedure (S2942).

According to the above-described embodiments of the present disclosure, the lift/thrust of the UAM aerial vehicle is driven through the plurality of propulsion units, but it is possible to efficiently perform the flight of the UAM aerial vehicle by applying the method of driving all or only some of the propulsion units mounted on the UAM aerial vehicle according to the flight mode or flight area.

That is, since a separate power supply path exists in a distributed manner for each propulsion unit, each electric motor may generate power independently.

In addition, the present disclosure describes a hybrid distributed electric propulsion system (H-DEP) structure in which the internal combustion engine and the battery unit can each generate the thrust/lift of the UAM aerial vehicle independently according to the flight mode, flight location, and flight status of the UAM aerial vehicle, but can be implemented in a fully distributed electric propulsion system (F-DEP) structure generating fully distributed electric thrust/lift that independently supplies power to the propulsion units of the UAM aerial vehicle by battery units only without an internal combustion engine.

As described above, when the structure that supplies power to the propulsion units of the UAM aerial vehicle is designed in the H-DEP or F-DEP method, since the UAM aerial vehicle may operate a plurality of propulsion units independently, even if one propulsion unit fails, it is possible to safely continue flight because the other propulsion units may continue to operate. In addition, due to the characteristics of the UAM aerial vehicle, which should fly at a low altitude in the urban area, less noise should be generated than the conventional aerial vehicle, so the sizes of the propulsion units are smaller than those of conventional aerial vehicles, and it is possible to reduce noise by selecting only the propulsion units necessary for the thrust/lift generation according to various flight conditions (take-off, ascending, cruise, descending, landing, etc.) of the UAM aerial vehicle.

Meanwhile, the methods according to various exemplary embodiments of the present disclosure described above may be implemented as programs and be provided to servers or devices. Therefore, the respective apparatuses may access the servers or the devices in which the programs are stored to download the programs.

In addition, the methods according to various exemplary embodiments of the present disclosure described above may be implemented as programs and be provided in a state in which it is stored in various non-transitory computer-readable media. The non-transitory computer-readable medium is not a medium that stores data therein for a while, such as a register, a cache, a memory, or the like, but means a medium that semi-permanently stores data therein and is readable by an apparatus. In detail, the various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

According to various embodiments of the present disclosure, it is possible to suppress noise and pollution generation in the urban area and increase operation efficiency by selecting either an electric propulsion method or an internal combustion engine propulsion method in consideration of a flight stage of the aerial vehicle.

According to embodiments of the present disclosure, it is possible to suppress noise and pollution generation in the urban area and increase operation efficiency by selecting either an electric propulsion method or an internal combustion engine propulsion method in consideration of a location on a flight route of an aerial vehicle.

The effects of the present disclosure are not limited to the above-mentioned effects, and other effects that are not mentioned may be obviously understood by those skilled in the art from the following description.

Although various embodiments of the present disclosure have been disclosed for illustrative purposes, those skilled in the art will appreciate that various modifications, additions and substitutions are possible, without departing from the scope and spirit of the present disclosure as disclosed in the accompanying claims. Accordingly, the scope of the present disclosure is not construed as being limited to the described embodiments but is defined by the appended claims as well as equivalents thereto.

The invention claimed is:

1. An aerial vehicle, comprising:
a power generation unit generating electricity by consuming fuel;
a battery unit that is charged with power supplied from the power generation unit or supplied with power from outside;
a plurality of fan modules receiving power from the battery unit or the power generation unit to provide lift to the aerial vehicle;
a power supply path control unit selecting at least one of the power generation unit and the battery unit as a power source for supplying power to at least one of the plurality of fan modules;
a processor generating a flight route from a departure point to a destination of the aerial vehicle;
a power management control unit determining an amount of energy consumption required for the flight route, and a charged amount of the battery unit and a loaded amount of the fuel based on the amount of energy consumption required for the flight route,
wherein the power management control unit further determines to supply power to the at least one of the plurality of fan modules through the battery unit only when the aerial vehicle is in a take-off stage, a landing stage, or located in an urban area, and determines to supply power to the at least one of the plurality of fan modules through the power generation unit only when the aerial vehicle is in a cruising stage or located in a non-urban area;
wherein the power supply path control unit supplies power to the at least one of the plurality of fan modules through the battery unit when a flight control system (FCS) determines that the take-off is possible by the battery unit alone, and
when the take-off is not possible by the battery unit alone, the flight control system determines whether the aerial vehicle is located in the urban or the non-urban area based on position information obtained through an inertial navigation system (INS), the flight control system generates a battery charging notification when the aerial vehicle is located in the urban area, and determines whether the take-off is possible using the power generation unit when the aerial vehicle is located in the non-urban area.

2. The aerial vehicle of claim 1, wherein the power supply path control unit supplies power to the at least one of the plurality of fan modules through the battery unit when a flight stage of the aerial vehicle corresponds to the take-off or the landing stage, and the aerial vehicle is located in the urban area.

3. The aerial vehicle of claim 1, wherein the power supply path control unit supplies power to the at least one of the plurality of fan modules through the power generation unit when a flight stage of the aerial vehicle corresponds to the cruising stage, and the aerial vehicle is located in the non-urban area.

4. The aerial vehicle of claim 1, wherein the power supply path control unit supplies power to the at least one of the plurality of fan modules through the battery unit when a flight stage of the aerial vehicle corresponds to any one of the take-off, an ascending a descending, and the landing stages, and the aerial vehicle is located in the urban area.

5. The aerial vehicle of claim 1, wherein the power supply path control unit supplies power to the at least one of the plurality of fan modules through the power generation unit when a location on the flight route of the aerial vehicle deviates from the urban area.

6. The aerial vehicle of claim 1, wherein the power management control unit determines an allowable gross take-off weight (AGTOW) based on the charged amount of the battery unit and the loaded amount of the fuel.

7. The aerial vehicle of claim 1, further comprising:
an inspection unit inspecting a pre-flight configuration of the aerial vehicle,
wherein, when an inspected result value is different from a preset result value, the inspection unit determines whether the aerial vehicle flies from the departure point to the destination along the flight route generated by the processor, and the inspection unit verifies a functionality of the power management control unit in selecting an appropriate power source based on a flight stage and the position information of the aerial vehicle.

8. The aerial vehicle of claim 7, further comprising:
a display unit displaying an appearance of the aerial vehicle and displaying an order in which the inspection unit inspects the pre-flight configuration of the aerial vehicle,
wherein the display unit displays a selected power source and a reason for a selection based on the flight stage and the position information of the aerial vehicle.

* * * * *